US012797794B2

(12) United States Patent
Furuya et al.

(10) Patent No.: US 12,797,794 B2
(45) Date of Patent: Nov. 17, 2026

(54) CARBON DIOXIDE CONCENTRATION PREDICTION SYSTEM, CARBON DIOXIDE CONCENTRATION PREDICTION METHOD, AND COMPUTER READABLE MEDIUM

(71) Applicant: Asahi Kasei Microdevices Corporation, Tokyo (JP)

(72) Inventors: Takaaki Furuya, Tokyo (JP); Masanori Masuda, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 809 days.

(21) Appl. No.: 17/893,164

(22) Filed: Aug. 22, 2022

(65) Prior Publication Data

US 2023/0054957 A1 Feb. 23, 2023

(30) Foreign Application Priority Data

Aug. 23, 2021 (JP) ................................ 2021-135865
Jul. 7, 2022 (JP) ................................ 2022-109647

(51) Int. Cl.
*B01D 53/92* (2006.01)

(52) U.S. Cl.
CPC ........ *B01D 53/92* (2013.01); *B01D 2257/504* (2013.01)

(58) Field of Classification Search
None
See application file for complete search history.

(56) References Cited

U.S. PATENT DOCUMENTS

| | | | |
|---|---|---|---|
| 9,182,751 | B1 | 11/2015 | Reeder |
| 10,002,523 | B2 | 6/2018 | Fadell |
| 10,032,343 | B2 | 7/2018 | Fadell |

(Continued)

FOREIGN PATENT DOCUMENTS

| | | | |
|---|---|---|---|
| CN | 1719137 | A | 1/2006 |
| CN | 104390310 | A | 3/2015 |

(Continued)

OTHER PUBLICATIONS

Richardson, Morrow, Kalil, Bekker, and Wood, "Shared Air: A renewed focus on Ventilation for the Prevention of Tuberculosis Transmission", Plos One, May 2014 (Year: 2014).*

(Continued)

*Primary Examiner* — Shelby A Turner
*Assistant Examiner* — Cynthia L Davis

(57) ABSTRACT

Provided is a carbon dioxide concentration prediction system including a prediction unit configured to predict, based on a current carbon dioxide concentration of an internal space in a prediction target and environment information in the prediction target, a carbon dioxide concentration of the internal space, and a provision unit configured to provide the carbon dioxide concentration predicted by the prediction unit. The prediction unit may further predict a change over time of the carbon dioxide concentration in the prediction target from the current carbon dioxide concentration to the carbon dioxide concentration predicted based on the current carbon dioxide concentration and the environment information, and the provision unit may further provide the change over time of the carbon dioxide concentration.

17 Claims, 30 Drawing Sheets

(56) References Cited

U.S. PATENT DOCUMENTS

| | | | | |
|---|---|---|---|---|
| 11,342,051 | B1 | 5/2022 | Jain | |
| 11,649,977 | B2 | 5/2023 | Chuan | |
| 11,913,654 | B1 | 2/2024 | Stamatakis | |
| 2004/0236240 | A1 | 11/2004 | Kraus | |
| 2006/0114113 | A1 | 6/2006 | Yokosawa | |
| 2006/0122738 | A1 | 6/2006 | Yamada | |
| 2007/0043576 | A1 | 2/2007 | Kumamoto | |
| 2008/0250661 | A1 | 10/2008 | Kou | |
| 2010/0014626 | A1 | 1/2010 | Fennell | |
| 2010/0292860 | A1 | 11/2010 | Komiya | |
| 2012/0197462 | A1 | 8/2012 | Sakai | |
| 2013/0098597 | A1 | 4/2013 | Fujimoto | |
| 2013/0210351 | A1* | 8/2013 | Ling | H04B 5/26<br>455/41.1 |
| 2014/0244198 | A1 | 8/2014 | Mayer | |
| 2014/0324527 | A1 | 10/2014 | Kulkarni | |
| 2017/0003258 | A1 | 1/2017 | Krauss | |
| 2017/0176187 | A1 | 6/2017 | Ishihama | |
| 2017/0208493 | A1 | 7/2017 | Masson | |
| 2017/0248564 | A1 | 8/2017 | Miyajima | |
| 2017/0254737 | A1 | 9/2017 | Ke | |
| 2017/0336343 | A1 | 11/2017 | Bhat | |
| 2017/0367618 | A1 | 12/2017 | Ricciardelli | |
| 2018/0128511 | A1 | 5/2018 | Motodani | |
| 2018/0195752 | A1 | 7/2018 | Sasaki | |
| 2018/0267004 | A1 | 9/2018 | Kusama | |
| 2019/0122759 | A1 | 4/2019 | Wakimoto | |
| 2019/0234920 | A1 | 8/2019 | Rangel | |
| 2019/0244507 | A1 | 8/2019 | Uruno | |
| 2019/0264940 | A1* | 8/2019 | Lee | F24F 11/58 |
| 2020/0187357 | A1 | 6/2020 | Park | |
| 2020/0227159 | A1* | 7/2020 | Boisvert | H04L 67/125 |
| 2020/0315548 | A1 | 10/2020 | Sato | |
| 2020/0348038 | A1 | 11/2020 | Risbeck | |
| 2020/0383172 | A1 | 12/2020 | Mccracken | |
| 2020/0393159 | A1 | 12/2020 | Takayanagi | |
| 2020/0401092 | A1 | 12/2020 | Gervais | |
| 2021/0018210 | A1 | 1/2021 | Nasis | |
| 2021/0041118 | A1 | 2/2021 | Morgan | |
| 2021/0043330 | A1 | 2/2021 | Hiroko | |
| 2021/0053413 | A1 | 2/2021 | Noh | |
| 2021/0072713 | A1 | 3/2021 | Matsumoto | |
| 2021/0088492 | A1 | 3/2021 | Lou | |
| 2021/0094686 | A1 | 4/2021 | Metzner | |
| 2021/0110704 | A1 | 4/2021 | Hanko | |
| 2021/0222901 | A1 | 7/2021 | Scaramelli | |
| 2021/0231338 | A1 | 7/2021 | Pham | |
| 2021/0239335 | A1 | 8/2021 | Morgan | |
| 2021/0239339 | A1 | 8/2021 | Morgan | |
| 2021/0409396 | A1 | 12/2021 | Funayama | |
| 2022/0003581 | A1 | 1/2022 | Fox | |
| 2022/0005609 | A1 | 1/2022 | Morizumi | |
| 2022/0040356 | A1 | 2/2022 | Ichihara | |
| 2022/0146482 | A1* | 5/2022 | Fuerst | G06N 20/00 |
| 2022/0187230 | A1 | 6/2022 | Thomas | |
| 2022/0288520 | A1 | 9/2022 | Suzuki | |
| 2022/0399105 | A1 | 12/2022 | Wagner Block | |
| 2023/0119668 | A1 | 4/2023 | Yamazaki | |
| 2023/0182766 | A1 | 6/2023 | Chou | |
| 2023/0272928 | A1 | 8/2023 | Livchak | |
| 2023/0277709 | A1* | 9/2023 | Hiramatsu | F24F 7/08<br>422/120 |
| 2024/0011658 | A1* | 1/2024 | Tsuruzono | F24F 11/0001 |

FOREIGN PATENT DOCUMENTS

| | | | | |
|---|---|---|---|---|
| CN | 106325067 | A | 1/2017 | |
| CN | 106384482 | A | 2/2017 | |
| CN | 106872650 | A | 6/2017 | |
| CN | 109812938 | A | 5/2019 | |
| CN | 110887807 | A | 3/2020 | |
| CN | 111523750 | A | 8/2020 | |
| DE | 202011105211 | U1 * | 11/2011 | B01D 46/0093 |
| EP | 2119965 | A1 | 11/2009 | |
| JP | H03162659 | A | 7/1991 | |
| JP | 2000088320 | A | 3/2000 | |
| JP | 2002056467 | A | 2/2002 | |
| JP | 2002169935 | A | 6/2002 | |
| JP | 2004108857 | A | 4/2004 | |
| JP | 2004196063 | A | 7/2004 | |
| JP | 2005056330 | A | 3/2005 | |
| JP | 2005147563 | A | 6/2005 | |
| JP | 2006064494 | A | 3/2006 | |
| JP | 2007213470 | A | 8/2007 | |
| JP | 2007264865 | A | 10/2007 | |
| JP | 2008052608 | A | 3/2008 | |
| JP | 2008281514 | A | 11/2008 | |
| JP | 2008304124 | A | 12/2008 | |
| JP | 2009230485 | A | 10/2009 | |
| JP | 2010093616 | A | 4/2010 | |
| JP | 2010121953 | A | 6/2010 | |
| JP | 2011158115 | A | 8/2011 | |
| JP | 2011162096 | A | 8/2011 | |
| JP | 2012008713 | A | 1/2012 | |
| JP | 2012073098 | A | 4/2012 | |
| JP | 2012128469 | A | 7/2012 | |
| JP | 2013047579 | A | 3/2013 | |
| JP | 2013195293 | A | 9/2013 | |
| JP | 2013257160 | A | 12/2013 | |
| JP | 2014228518 | A | 12/2014 | |
| JP | 2015018517 | A | 1/2015 | |
| JP | 2015068697 | A | 4/2015 | |
| JP | 5835734 | B2 | 12/2015 | |
| JP | 2016031382 | A | 3/2016 | |
| JP | 2016081090 | A | 5/2016 | |
| JP | 2016140800 | A | 8/2016 | |
| JP | 2016195639 | A | 11/2016 | |
| JP | 2016201345 | A | 12/2016 | |
| JP | 2017048962 | A | 3/2017 | |
| JP | 2017151698 | A | 8/2017 | |
| JP | 2017189444 | A | 10/2017 | |
| JP | 2017203581 | A | 11/2017 | |
| JP | 2018017403 | A | 2/2018 | |
| JP | 2018048749 | A | 3/2018 | |
| JP | 2018120468 | A | 8/2018 | |
| JP | 2018206302 | A | 12/2018 | |
| JP | 6557853 | B2 | 8/2019 | |
| JP | 2020024586 | A | 2/2020 | |
| JP | 2020067402 | A | 4/2020 | |
| JP | 2020067939 | A | 4/2020 | |
| JP | 2020071621 | A | 5/2020 | |
| JP | 2020144628 | A | 9/2020 | |
| JP | 2020154976 | A | 9/2020 | |
| JP | 2021081171 | A | 5/2021 | |
| JP | 3232288 | U | 6/2021 | |
| JP | 2022151708 | A | 10/2022 | |
| JP | 7217824 | B1 | 2/2023 | |
| KR | 20160104940 | A | 9/2016 | |
| KR | 20200060865 | A | 6/2020 | |
| KR | 20200105093 | A | 9/2020 | |
| KR | 20210012797 | A | 2/2021 | |
| WO | 2007057966 | A1 | 5/2007 | |
| WO | 2015151363 | A1 | 10/2015 | |
| WO | WO-2017135628 | A1 * | 8/2017 | F24F 11/89 |
| WO | WO-2018061147 | A1 * | 4/2018 | F24F 11/77 |
| WO | 2019130452 | A1 | 7/2019 | |
| WO | WO-2020059442 | A1 * | 3/2020 | F24F 7/003 |
| WO | 2020116022 | A1 | 6/2020 | |
| WO | 2020144247 | A1 | 7/2020 | |
| WO | 2020153151 | A1 | 7/2020 | |
| WO | WO-2020179186 | A1 * | 9/2020 | A61B 5/7275 |
| WO | 2020217616 | A1 | 10/2020 | |
| WO | 2022065066 | A1 | 3/2022 | |

OTHER PUBLICATIONS

Rudnick and Milton, Risk of Indoor Airborne Infection Transmission Estimated from Carbon Dioxide Concentration, Indoor Air 2003 (Year: 2003).*

Office Action issued for related Chinese Application 202210307504.2, issued by The State Intellectual Property Office of People's Republic of China on Jun. 13, 2023.

(56) References Cited

OTHER PUBLICATIONS

Guanzhong, "Construction and management of computer room", Shaanxi Science and Technology Publishing, pp. 553-554, Jun. 30, 1993.

* cited by examiner

CARBON DIOXIDE CONCENTRATION PREDICTION SYSTEM, CARBON DIOXIDE CONCENTRATION PREDICTION METHOD, AND COMPUTER READABLE MEDIUM

The contents of the following Japanese patent application (s) are incorporated herein by reference:

NO. 2021-135865 filed in JP on Aug. 23, 2021

NO. 2022-109647 filed in JP on Jul. 7, 2022

BACKGROUND

1. Technical Field

The present invention relates to a carbon dioxide concentration prediction system, a carbon dioxide concentration prediction method, and a computer readable medium.

2. Related Art

Patent document 1 describes that "in power generation equipment, a technique is provided to efficiently arrange a carbon dioxide sensing device configured to sense a concentration of emitted carbon dioxide" (abstract of the disclosure).

LIST OF CITED REFERENCES

Patent Documents

Patent document 1: Japanese Patent Application Publication No. 2012-008713

DESCRIPTION OF EXEMPLARY EMBODIMENTS

Hereinafter, the invention will be described through embodiments of the present invention, but the following embodiments do not limit the invention according to claims. In addition, not all of the combinations of features described in the embodiments are essential to the solving means of the invention.

Figure 1:
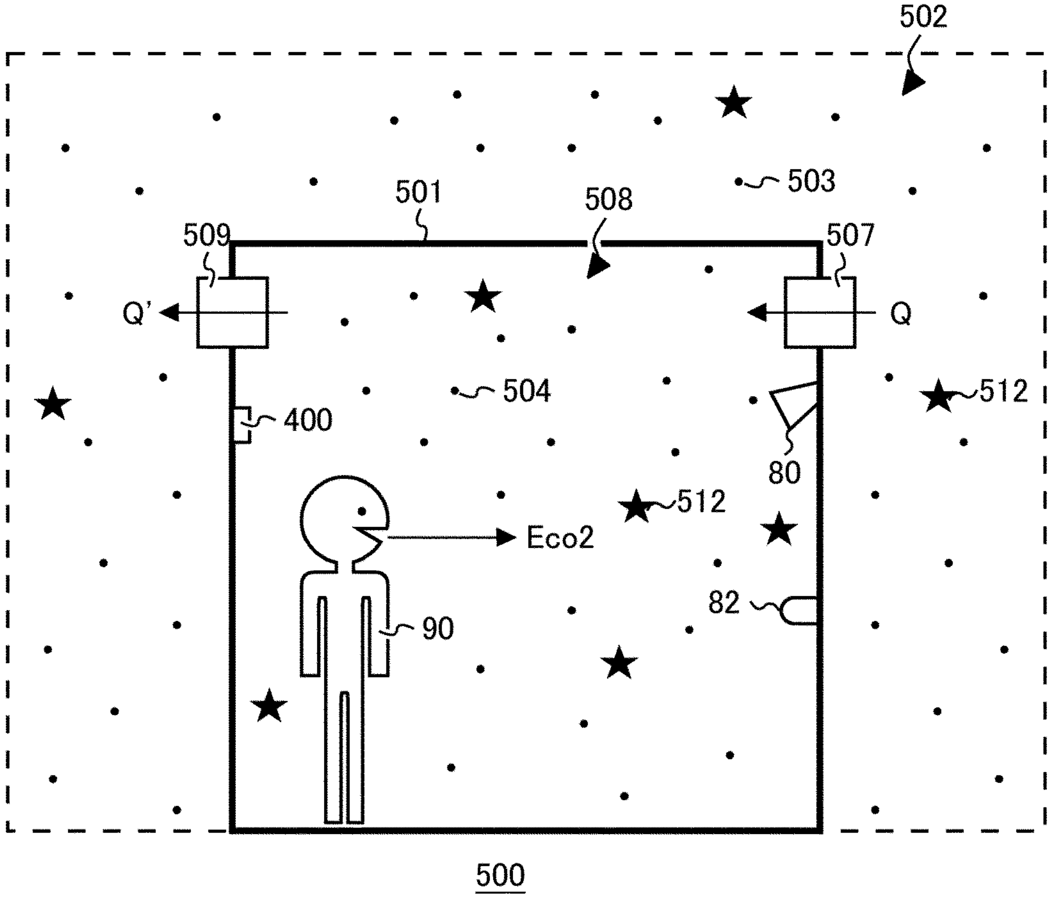
FIG. 1 illustrates an example of a prediction target 500 according to an embodiment of the present invention.

FIG. 1 illustrates an example of a prediction target 500 according to an embodiment of the present invention. The prediction target 500 is a target of a prediction of a $CO_2$ (carbon dioxide) concentration. The prediction target 500 refers to a space surrounding a room 501. In FIG. 1, the prediction target 500 is represented by a coarse dashed line.

An internal space 508 is a space inside the room 501. The internal space 508 is a space separated from the outside of the internal space 508. The internal space 508 contains a gas including $CO_2$ (carbon dioxide). The gas is referred to as an internal gas 504. An external space 502 is a space outside the room 501. The external space 502 is a space outside the internal space 508. The prediction target 500 may include the internal space 508 and the external space 502. A gas in the external space 502 is referred to as an external gas 503.

At least one of a supply unit 507 or an exhaust unit 509 may be provided in the room 501. In the present example, both the supply unit 507 and the exhaust unit 509 are provided in the room 501. The supply unit 507 is configured to supply the external gas 503 to the internal space 508. The exhaust unit 509 is configured to evacuate the internal gas 504 to the external space 502. At least one of the supply unit 507 or the exhaust unit 509 may adjust a quality of the internal gas 504 by causing the internal gas 504 to circulate or cleaning the internal gas 504. The supply unit 507 is, for example, air conditioning equipment, an air cleaner, an air conditioner, a window, a heating ventilation and air conditioning (HVAC) system, or the like. The exhaust unit 509 is, for example, a ventilation fan, a ventilation opening, a window, a heating ventilation and air conditioning (HVAC) system, or the like.

A supply amount of the external gas 503 supplied by the supply unit 507 is set as a supply amount Q. The supply amount Q may be a volume or a mass of the external gas 503. An exhaust amount of the internal gas 504 evacuated by the exhaust unit 509 is set as an exhaust amount Q'. The exhaust amount Q' may be a volume or a mass of the internal gas 504. The exhaust amount Q' may be equal to the supply amount Q.

A living subject 90 may exist in the internal space 508. The living subject 90 is a living matter repeating exhalation from a lung and inspiration to the lung. In the present example, the living subject 90 is a human being. The living subject 90 exhausts $CO_2$ (carbon dioxide) to the internal space 508. An amount of $CO_2$ (carbon dioxide) exhausted by the living subject 90 to the internal space 508 is set as an exhaust amount $E_{co2}$. The exhaust amount $E_{co2}$ may be an amount of $CO_2$ (carbon dioxide) exhausted per unit time by the living subject 90. The exhaust amount $E_{co2}$ may be a volume or a mass of $CO_2$ (carbon dioxide) exhausted by the living subject 90.

A $CO_2$ (carbon dioxide) sensor 400 may be arranged in the internal space 508. The $CO_2$ (carbon dioxide) sensor 400 is configured to measure a concentration of $CO_2$ (carbon dioxide) in the internal space 508.

An infectious source 512 may exist in the internal space 508. In FIG. 1, the infectious source 512 is represented by a star mark. The infectious source 512 is, for example, a virus, germ, or the like. The infectious source 512 may be included in the internal gas 504, or may be included in the external gas 503. The infectious source 512 is, for example, a SARS-CoV-2 virus. The SARS-CoV-2 virus is a so-called novel coronavirus. When the living subject 90 is infected with the infectious source 512 (see FIG. 1), the infectious source 512 exhausted by exhalation of the living subject 90 may exist in the prediction target 500.

An image capturing unit 80 may be arranged in the internal space 508. The image capturing unit 80 is, for example, a camera. The image capturing unit 80 may be a thermography camera configured to measure a body temperature of the living subject 90. The image capturing unit 80 is configured to capture an image of the internal space 508. The image capturing unit 80 may capture a still image, or may capture a moving image.

A LIDAR system may be arranged in the internal space 508. The light detection and ranging (LIDAR) refers to a technique for measuring a distance between the LIDAR and an object by irradiating the object with laser light and measuring its reflected light by an optical sensor or imaging a space irradiated with laser light by irradiating an object with the laser light. A carbon dioxide concentration prediction system 300 (which will be described below) can acquire, by the LIDAR system, at least one of a distance between a plurality of living subjects 90, location information of the living subject 90, information of a magnitude of the internal space 508, or the like.

An audio acquisition unit 82 may be arranged in the prediction target 500. The audio acquisition unit 82 is, for example, a microphone. The audio acquisition unit 82 is configured to acquire a sound of the living subject 90.

Figure 2:
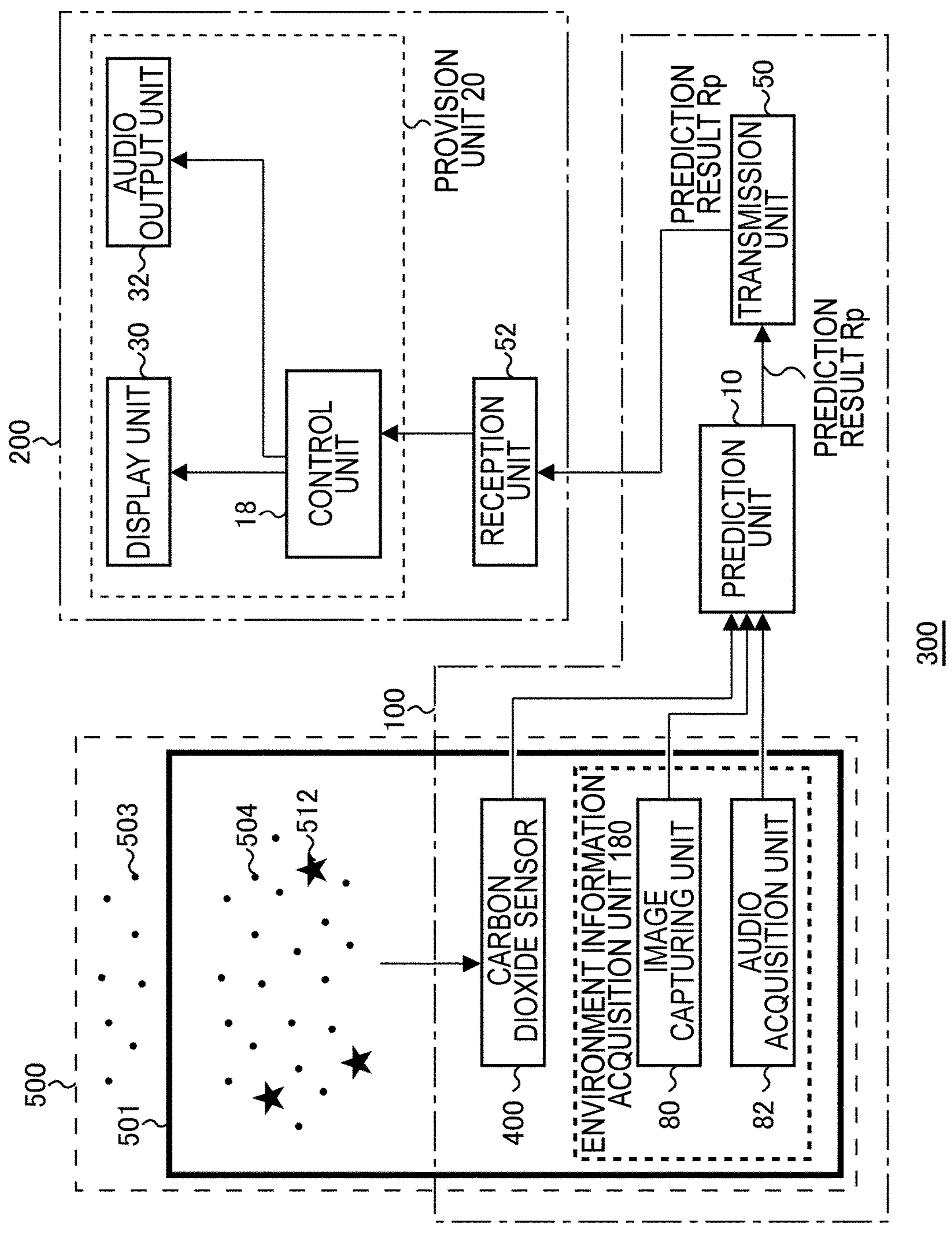
FIG. 2 is a block diagram illustrating an example of a carbon dioxide concentration prediction system 300 according to an embodiment of the present invention.

FIG. 2 is a block diagram illustrating an example of the carbon dioxide concentration prediction system 300 according to an embodiment of the present invention. The carbon dioxide concentration prediction system 300 includes a prediction unit 10 and a provision unit 20. The carbon dioxide concentration prediction system 300 may include a carbon dioxide concentration prediction apparatus 100 and a terminal 200. In FIG. 2, a range of the carbon dioxide concentration prediction apparatus 100 is represented by a dashed-dotted line, and a range of the terminal 200 is represented by a dashed-two dotted line. In the present example, the carbon dioxide concentration prediction apparatus 100 includes the prediction unit 10, and the terminal 200 includes the provision unit 20.

The carbon dioxide concentration prediction apparatus 100 may have the $CO_2$ (carbon dioxide) sensor 400, an environment information acquisition unit 180, and a transmission unit 50. The environment information acquisition unit 180 is configured to acquire environment information. The environment information is set as environment information Ie. The environment information Ie will be described below. The environment information acquisition unit 180 may include the image capturing unit 80 and the audio acquisition unit 82. The transmission unit 50 is configured to transmit a prediction result predicted by the prediction unit 10. The prediction result is set as prediction result Rp.

The prediction unit 10 may be a central processing unit (CPU). The carbon dioxide concentration prediction apparatus 100 may be a computer including the CPU, a memory, an interface, and the like. The carbon dioxide concentration prediction apparatus 100 may be a portable computer such as a tablet, or may be a mobile terminal. The carbon dioxide concentration prediction apparatus 100 may be a computer on cloud.

The terminal 200 may have a reception unit 52. The reception unit 52 is configured to receive the prediction result Rp transmitted by the transmission unit 50. The transmission unit 50 may transmit the prediction result Rp by wireless communication, or may transmit the prediction result Rp in wired communication. The reception unit 52 may receive the prediction result Rp by wireless communication, or may receive the prediction result Rp by wired communication. The wireless communication may refer to short range wireless communication such as Wi-Fi (registered trademark) or Bluetooth (registered trademark).

The provision unit 20 may have a control unit 18, a display unit 30, and an audio output unit 32. The provision unit 20 may have at least one of the display unit 30 or the audio output unit 32. In the present example, the provision unit 20 has both the display unit 30 and the audio output unit 32.

The display unit 30 is configured to display the prediction result Rp. The display unit 30 is, for example, a display, a monitor, or the like. When the terminal 200 is a tablet computer, the display unit 30 may be a display of the tablet computer.

The audio output unit 32 is configured to output audio related to the prediction result Rp. The audio output unit 32 is, for example, a speaker. The audio related to the prediction result Rp is, for example, a warning sound or the like for warning that, when a $CO_2$ (carbon dioxide) concentration of the internal space 508 approaches a predetermined concentration, the carbon dioxide concentration approaches the predetermined concentration.

The control unit 18 may be a central processing unit (CPU). The terminal 200 may be a mobile terminal including the CPU, or may be a portable computer such as a tablet. The terminal 200 may be a computer including the CPU, a memory, an interface, and the like.

The control unit 18 is configured to cause the prediction result Rp received by the reception unit 52 to be displayed on the display unit 30 and output to the audio output unit 32. A state in which the provision unit 20 provides the prediction result Rp may refer to a state in which the control unit 18 causes the display unit 30 to display the prediction result Rp, or may refer to a state in which the audio output unit 32 is caused to output the prediction result Rp.

Figure 3:
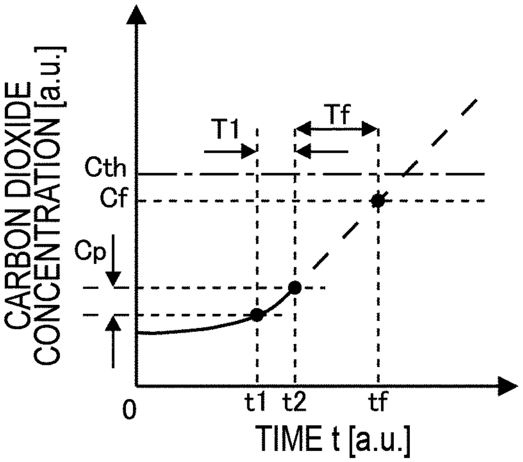
FIG. 3 illustrates an example of a relationship between a $CO_2$ (carbon dioxide) concentration of an internal space 508 which is measured by a $CO_2$ (carbon dioxide) sensor 400 and a time t.
Figure 4:
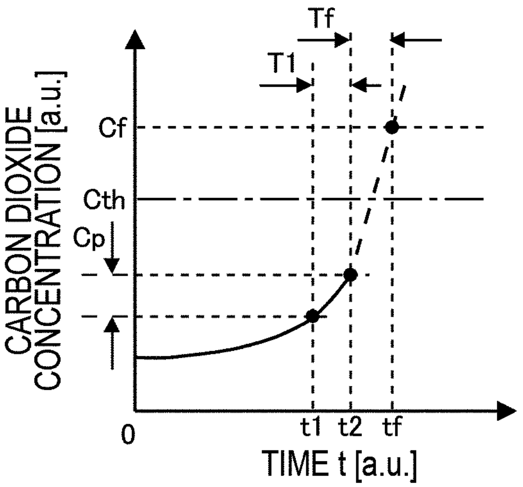
FIG. 4 illustrates an example of a relationship between a $CO_2$ (carbon dioxide) concentration of the internal space 508 which is measured by the $CO_2$ (carbon dioxide) sensor 400 and the time t.
Figure 5:
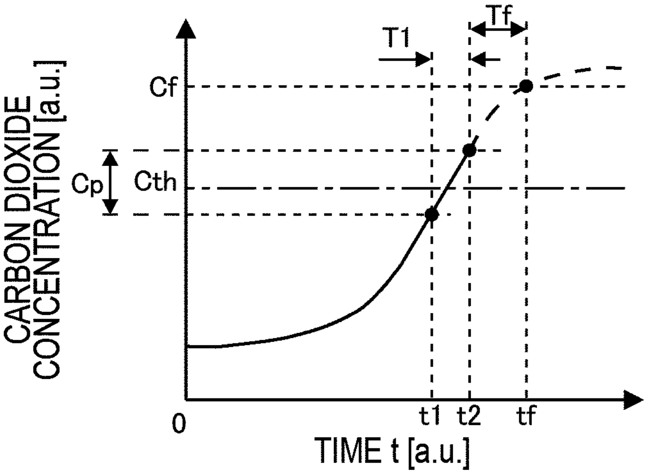
FIG. 5 illustrates an example of a relationship between a $CO_2$ (carbon dioxide) concentration of the internal space 508 which is measured by the $CO_2$ (carbon dioxide) sensor 400 and the time t.

FIG. 3 to FIG. 5 illustrate an example of a relationship between a $CO_2$ (carbon dioxide) concentration of the internal space 508 which is measured by the $CO_2$ (carbon dioxide) sensor 400 (see FIG. 1) and a time t. In FIG. 3 to FIG. 5, the $CO_2$ (carbon dioxide) sensor 400 is set to start measurement of the $CO_2$ (carbon dioxide) concentration at a clock time t1 and continue the measurement of the $CO_2$ (carbon dioxide) concentration until a clock time t2. The clock time t1 is a clock time earlier than the clock time t2 by a predetermined time. The time is set as a time T1. A clock time later than the clock time t2 by a predetermined time is set as a clock time tf. The time is set as a time Tf. The clock time t2 may be a current clock time. The clock time t2 may be sequentially updated after the clock time t1.

The prediction unit 10 (see FIG. 2) is configured to predict the $CO_2$ (carbon dioxide) concentration of the internal space 508 based on the current $CO_2$ (carbon dioxide) concentration of the internal space 508 (see FIG. 1) and the environment information Ie in the prediction target 500. The current $CO_2$ (carbon dioxide) concentration may refer to the $CO_2$ (carbon dioxide) concentration during the time T1 in FIG. 3. The current $CO_2$ (carbon dioxide) concentration is set as a concentration Cp.

The $CO_2$ (carbon dioxide) concentration predicted by the prediction unit 10 (see FIG. 2) may refer to the $CO_2$ (carbon dioxide) concentration at the clock time tf. When the clock time t2 is the current clock time, the clock time tf is a clock time in future. The $CO_2$ (carbon dioxide) concentration at the clock time tf which is predicted by the prediction unit 10 is set as a concentration Cf. Note that the prediction result Rp described above refers to the concentration Cf.

A predetermined threshold concentration of $CO_2$ (carbon dioxide) in the internal space 508 (see FIG. 1) is set as a threshold concentration Cth. The threshold concentration Cth is, for example, a concentration of $CO_2$ (carbon dioxide) at which a risk for the living subject 90 (see FIG. 1) existing in the internal space 508 to be infected with the infectious source 512 (see FIG. 1) becomes higher than or equal to a predetermined ratio. When the infectious source 512 is a SARS-CoV-2 virus, the threshold concentration Cth may be a concentration of $CO_2$ (carbon dioxide) at which it is determined that a probability that the living subject 90 is in a state of a closed space, a crowded place, and a close contact setting (state of so-called three Cs) is high. The threshold concentration Cth is, for example, 1000 ppm. Note that the risk of being infected with the infectious source 512 may change for each region and for each period. The threshold concentration Cth may be changed in accordance with a change of the risk of being infected for each region and for each period. The threshold concentration Cth may be changed by control online or the like.

The environment information Ie is information related to an environment of the prediction target 500 (see FIG. 1). The environment information Ie may include information related to the $CO_2$ (carbon dioxide) concentration. The information related to the $CO_2$ (carbon dioxide) concentration may refer to a rate of change over time of the $CO_2$ (carbon dioxide) concentration during the time T1, or may refer to a rate of change over time of the $CO_2$ (carbon dioxide) concentration during the time Tf.

The environment information Ie may include information related to the living subject 90 (see FIG. 1). The information related to the living subject 90 (see FIG. 1) may refer to information that may affect a risk degree of being infected with the infectious source 512 (see FIG. 1) in the prediction target 500 (see FIG. 1). The information related to the living subject 90 may include information of the exhaust amount $E_{co2}$ (see FIG. 1). The information is set as exhaust amount information Ic.

The exhaust amount information Ic is information that may affect the exhaust amount $E_{co2}$ of $CO_2$ (carbon dioxide) by the living subject 90. The exhaust amount information Ic may include at least one of sound information Iv (described below) of the living subject 90 (see FIG. 1), number information In (described below) of the living subject 90, body temperature information of the living subject 90, exposure information of a nose or a mouth of the living subject 90, stay time information of the living subject 90, or motion information Im (described below) of the living subject 90. The environment information Ie may include at least one of location information of the living subject 90 in the internal space 508 (see FIG. 1) or, when a plurality of living subjects 90 exist in the internal space 508, information of a distance between the plurality of living subjects 90.

The environment information Ie may include information of a particulate substance floating in the internal space 508. The particulate substance is, for example, a particle matter (PM) 2.5. The particulate substance can be sensed by the LIDAR system described above or a dust sensor.

In the carbon dioxide concentration prediction system 300, the prediction unit 10 (see FIG. 2) is configured to predict the $CO_2$ (carbon dioxide) concentration Cf of the internal space 508 based on the concentration Cp (current $CO_2$ (carbon dioxide) concentration) of the internal space 508 (see FIG. 1) and the environment information Ie. Thus, a user of the carbon dioxide concentration prediction system 300 can recognize the concentration Cf in the internal space 508. The user of the carbon dioxide concentration prediction system 300 can recognize whether the concentration Cf exceeds the threshold concentration Cth.

Note that FIG. 3 is an example of a case where the concentration Cf does not exceed the threshold concentration Cth, and FIG. 4 is an example of a case where the concentration Cf exceeds the threshold concentration Cth. FIG. 5 is an example of a case where the $CO_2$ (carbon dioxide) concentration measured by the $CO_2$ (carbon dioxide) sensor 400 (see FIG. 1) exceeds the threshold concentration Cth during the time T1.

Figure 6:
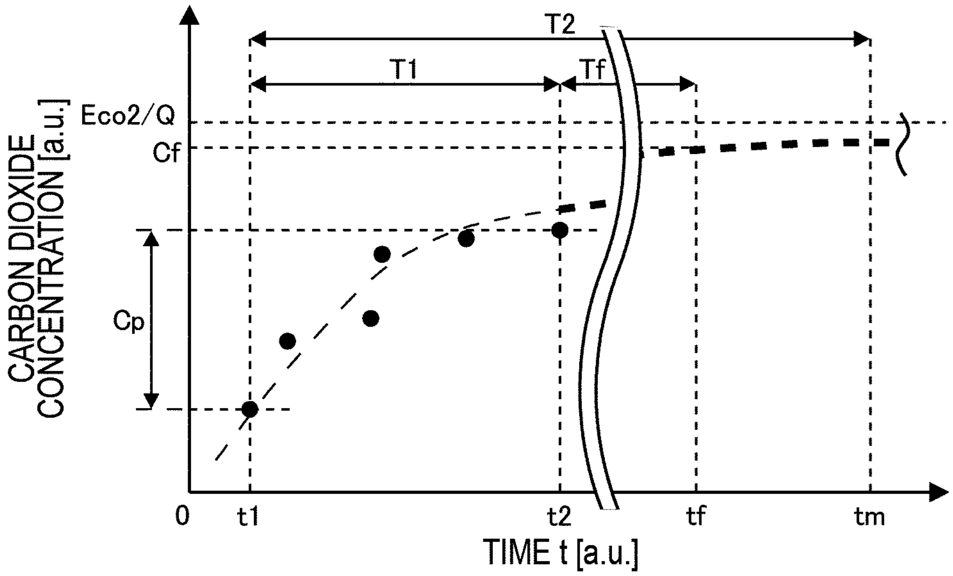
FIG. 6 is a diagram for describing an example of prediction of a concentration Cf by a prediction unit 10 in the examples of FIG. 3 to FIG. 5.

FIG. 6 is a diagram for describing an example of the prediction of the concentration Cf by the prediction unit 10 in FIG. 3 to FIG. 5. The $CO_2$ (carbon dioxide) concentration of the internal space 508 (see FIG. 1) is set as a concentration C. The $CO_2$ (carbon dioxide) concentration of the external space 502 (see FIG. 1) is set as a concentration $c_o$. The supply amount Q of the external gas 503 (see FIG. 1) and the exhaust amount Q' of the internal gas 504 (see FIG. 1) are set to be equal to each other. A volume of the internal space 508 is set as a volume V. A change over time of the $CO_2$ (carbon dioxide) concentration of the internal space 508 is represented by the following Expression 1.

(Expression. 1)

$$\frac{dC}{dt} = E_{co2} - (c - c_0)Q \tag{1}$$

When Expression 1 is transformed, the following expression 2 is obtained.

(Expression. 2)

$$c - c_0 = \left(c - c_0 - \frac{E_{co2}}{Q}\right)_{t=0} \exp\left(-\frac{Q}{V}t\right) + \frac{E_{co2}}{Q} \tag{2}$$

In Expression 2, the concentration C in a coefficient of a first term on a right side is the $CO_2$ (carbon dioxide) concentration of the internal space 508 at the clock time t=0.

In FIG. 6, a measured value of the $CO_2$ (carbon dioxide) concentration ($c-c_0$) is plotted using a black dot. The measured value of the $CO_2$ (carbon dioxide) concentration ($c-c_0$) may be stored in a storage unit 40 (see FIG. 20 described below). The measured value of the $CO_2$ (carbon dioxide) concentration ($c-c_0$) from the clock time t1 to the clock time t2 may be fitted by Expression 2. In FIG. 6, a result after the measured value of the $CO_2$ (carbon dioxide) concentration ($c-c_0$) is fitted by Expression 2 is represented by a coarse dashed line. In FIG. 6, the coarse dashed line at and after the clock time t2 is represented by a thick line. When the change over time of the $CO_2$ (carbon dioxide) concentration ($c-c_0$) is in accordance with Expression 2, the $CO_2$ (carbon dioxide) concentration ($c-c_0$) becomes asymptotically closer to a constant value ($E_{co2}$/Q) with an elapse of the time t.

Note that as a concentration $c_0$, a $CO_2$ (carbon dioxide) concentration of the internal space 508 which is measured in a state in which the living subject 90 does not exist in the internal space 508 and also ventilation is sufficiently conducted may be used. As the concentration $c_0$, a $CO_2$ (carbon dioxide) concentration acquired from a satellite or public measurement institution may be used, or a $CO_2$ (carbon dioxide) concentration generally assumed in the external space 502 may be used. The $CO_2$ (carbon dioxide) concentration generally assumed in the external space 502 is, for example, 400 ppm.

The clock time t at which the $CO_2$ (carbon dioxide) concentration ($c-c_0$) becomes a predetermined ratio to the constant value ($E_{co2}$/Q) as a result of the fitting by Expression 2 is set as a clock time tm. The predetermined ratio is a ratio of the $CO_2$ (carbon dioxide) concentration ($c-c_0$) to the constant value ($E_{co2}$/Q) at which the $CO_2$ (carbon dioxide) concentration ($c-c_0$) may be regarded as reaching the constant value ($E_{co2}$/Q). The ratio is, for example, 95%. Note that the clock time tf is any clock time from the clock time t2 to the clock time tm.

A time from the clock time t1 to the clock time tm is set as a time T2. In order that the $CO_2$ (carbon dioxide) concentration ($c-c_0$) may be regarded as reaching the constant value ($E_{co2}$/Q), T2 is preferably 3 times or more as long as T1, and is more preferably 10 times or more as long as T1.

The prediction unit 10 (see FIG. 2) may predict the $CO_2$ (carbon dioxide) concentration (the concentration Cf) of the internal space 508 at the clock time tf by Expression 2. The prediction unit 10 may predict the concentration Cf by Expression 2 based on the measured value of the $CO_2$ (carbon dioxide) concentration ($c-c_0$) which is stored in the storage unit 40 (described below). The prediction unit 10 may continue updating the concentration Cf predicted by Expression 2 based on a plurality of the measured values at and after the clock time t1 up to the clock time t2 according to the update of the clock time t2.

The update of the clock time t2 may be continued up to a predetermined clock time after the clock time t1. The predetermined clock time is set as a clock time t2*e*. When the clock time t2 has reached the clock time t2*e*, the update of the clock time t2 may be ended.

Figure 7:
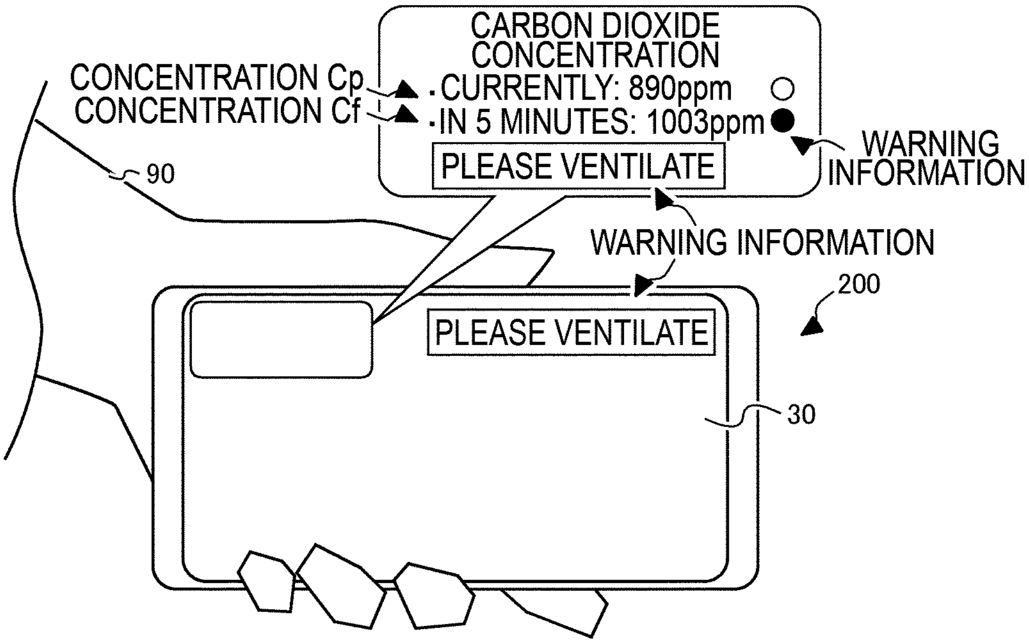
FIG. 7 illustrates an example of provision of the concentration Cf by a provision unit 20.

FIG. 7 illustrates an example of the provision of the concentration Cf by the provision unit 20 (see FIG. 2). In the present example, the terminal 200 is a smartphone. The provision unit 20 (see FIG. 2) is configured to provide the concentration Cf predicted by the prediction unit 10 (see FIG. 2). The provision unit 20 may provide the concentration Cp (current $CO_2$ (carbon dioxide) concentration) in the prediction target and the concentration Cf. In the present example, the control unit 18 (see FIG. 2) of the terminal 200 (smartphone) is configured to cause the concentration Cf to be displayed on the display unit 30.

A term "currently" illustrated in FIG. 7 may refer to the clock time t2 in FIGS. 3 to 6. A term "in 5 minutes" illustrated in FIG. 7 may refer to the clock time tf in FIGS. 3 to 6. In the present example, it is displayed on the display unit 30 that the concentration Cp is 890 ppm, and the concentration Cf is 1003 ppm.

The provision unit 20 (see FIG. 2) may provide warning information indicating that the $CO_2$ (carbon dioxide) concentration is higher than the threshold concentration Cth. It is set in the present example that the concentration Cp at 890 ppm is lower than the threshold concentration Cth, and the concentration Cf at 1003 ppm is higher than or equal to the threshold concentration Cth. In the present example, on the display unit 30, an indication of a white dot representing that the concentration Cp is lower than the threshold concentration Cth is displayed, and an indication of a black dot as warning information which represents that the concentration Cf is higher than or equal to the threshold concentration Cth is displayed.

The prediction unit 10 (see FIG. 2) may predict a change over time of the $CO_2$ (carbon dioxide) concentration in the prediction target 500 from the concentration Cp to the concentration Cf. In the present example, the prediction unit 10 predicts a change over time after the clock time t2 which is a change over time of the $CO_2$ (carbon dioxide) concentration. The change over time of the $CO_2$ (carbon dioxide) concentration refers to a coarse dashed line section in the examples illustrated in FIGS. 3 to 6.

The provision unit 20 may further provide the change over time of the $CO_2$ (carbon dioxide) concentration which is predicted by the prediction unit 10. The provision of the change over time of the $CO_2$ (carbon dioxide) concentration by the provision unit 20 may refer to display of the relationship between the $CO_2$ (carbon dioxide) concentration and the time t which is illustrated in FIG. 3 to FIG. 5 on the display unit 30 by the provision unit 20.

Figure 8:
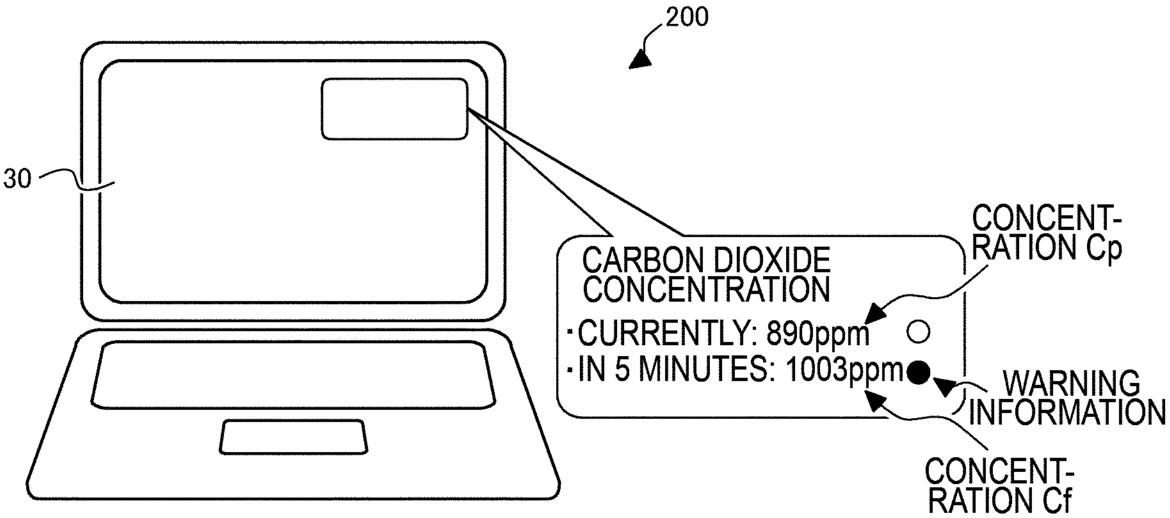
FIG. 8 illustrates another example of the provision of the concentration Cf by the provision unit 20.

FIG. 8 illustrates another example of the provision of the concentration Cf by the provision unit 20 (see FIG. 2). In the present example, the terminal 200 is a notebook computer. In the present example, the control unit 18 (see FIG. 2) of the terminal 200 (notebook computer) is configured to cause the concentration Cf to be displayed on the display unit 30. Similarly as in the example of FIG. 7, in the present example too, on the display unit 30, the indication of the white dot representing that the concentration Cp is lower than the threshold concentration Cth is displayed, and the indication of the black dot representing that the concentration Cf is higher than or equal to the threshold concentration Cth is displayed.

Figure 9:
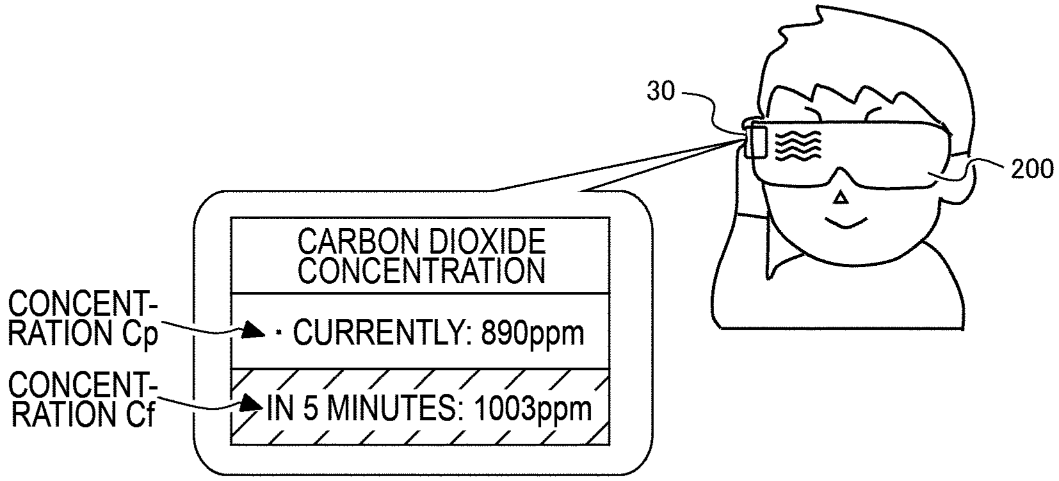
FIG. 9 illustrates another example of the provision of the concentration Cf by the provision unit 20.

FIG. 9 illustrates another example of the provision of the concentration Cf by the provision unit 20 (see FIG. 2). In the present example, the terminal 200 is smart glasses. In the present example, the control unit 18 (see FIG. 2) of the terminal 200 (smart glasses) is configured to cause the concentration Cf to be displayed on the display unit 30. It is set in the present example too that the concentration Cp is lower than the threshold concentration Cth, and the concentration Cf is higher than or equal to the threshold concentration Cth. In the present example, a background of the display of the concentration Cp and a background of the display of the concentration Cf are displayed on the display unit 30 in different modes. In FIG. 9, a background of the display of the concentration Cf is indicated by hatching, but the background may be displayed in a color different from that of a background of the display of the concentration Cp.

Figure 10:
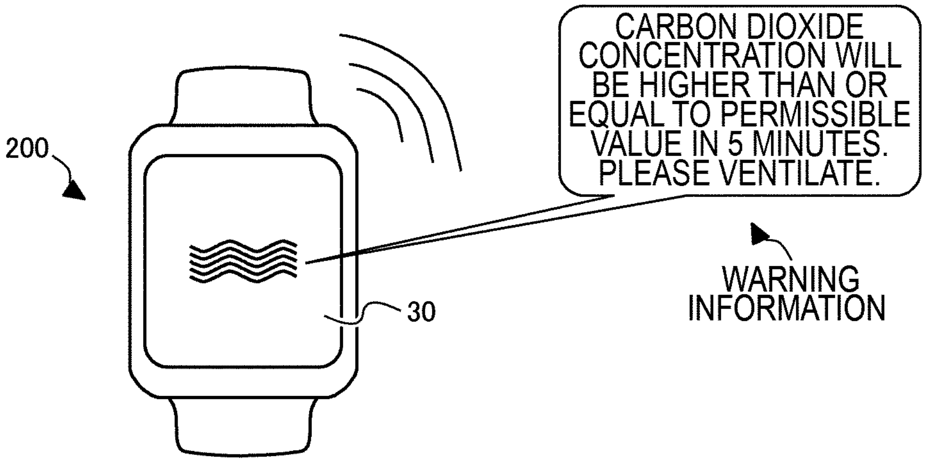
FIG. 10 illustrates another example of the provision of the concentration Cf by the provision unit 20.

FIG. 10 illustrates another example of the provision of the concentration Cf by the provision unit 20 (see FIG. 2). In the present example, the terminal 200 is a smartwatch. In the present example, the control unit 18 (see FIG. 2) of the terminal 200 (smartwatch) is configured to cause the concentration Cf to be displayed on the display unit 30 and also vibrate the terminal 200. In the present example, a text indicating that the concentration Cf is to become higher than or equal to the threshold concentration Cth at the clock time tf (display of "in 5 minutes" in FIG. 10) is displayed on the display unit 30.

Figure 11:
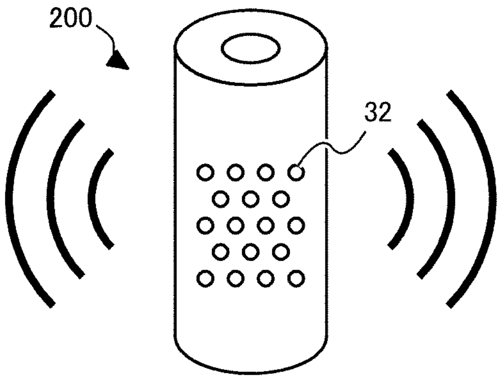
FIG. 11 illustrates another example of the provision of the concentration Cf by the provision unit 20.

FIG. 11 illustrates another example of the provision of the concentration Cf by the provision unit 20 (see FIG. 2). In the present example, the terminal 200 is a smart speaker. The terminal 200 may be a desktop type speaker. In the present example, the control unit 18 (see FIG. 2) of the terminal 200 (smart speaker) is configured to cause the audio output unit 32 to output the concentration Cf. In the present example, an announcement that the concentration Cf is to become higher than or equal to the threshold concentration Cth at the clock time tf (display of "in 5 minutes" in FIG. 10) is output from the audio output unit 32. Note that the terminal 200 may be an earphone.

Figure 12:
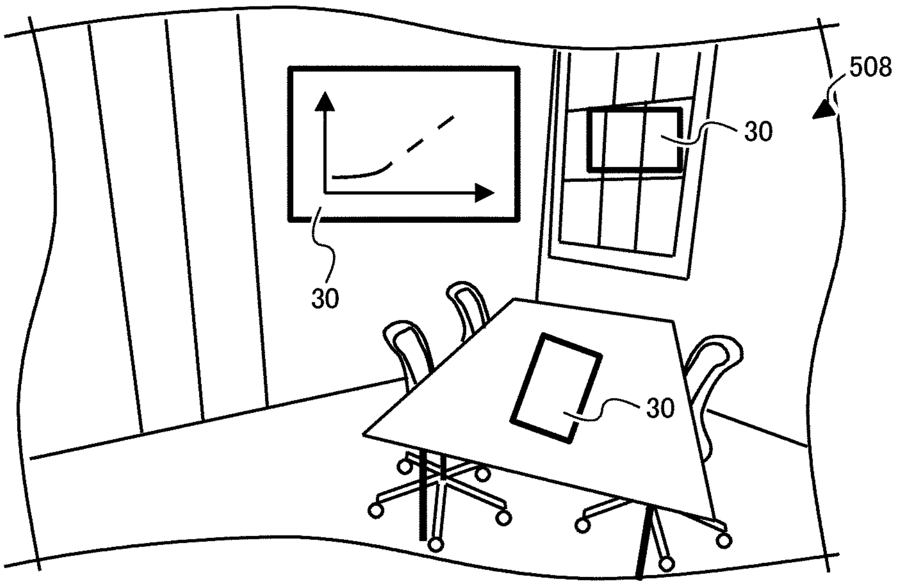
FIG. 12 illustrates another example of the provision of the concentration Cf by the provision unit 20.

FIG. 12 illustrates another example of the provision of the concentration Cf by the provision unit 20 (see FIG. 2). In the present example, the terminal 200 is a smart wall, a smart desk, or a smart window. In the present example, the control unit 18 (see FIG. 2) of the terminal 200 (smart wall) is configured to cause the concentration Cf to be displayed on the display unit 30. In the present example, a relationship between the $CO_2$ (carbon dioxide) concentration displayed in any of FIG. 3 to FIG. 5 and the time t is displayed on the display unit 30.

Figure 13:
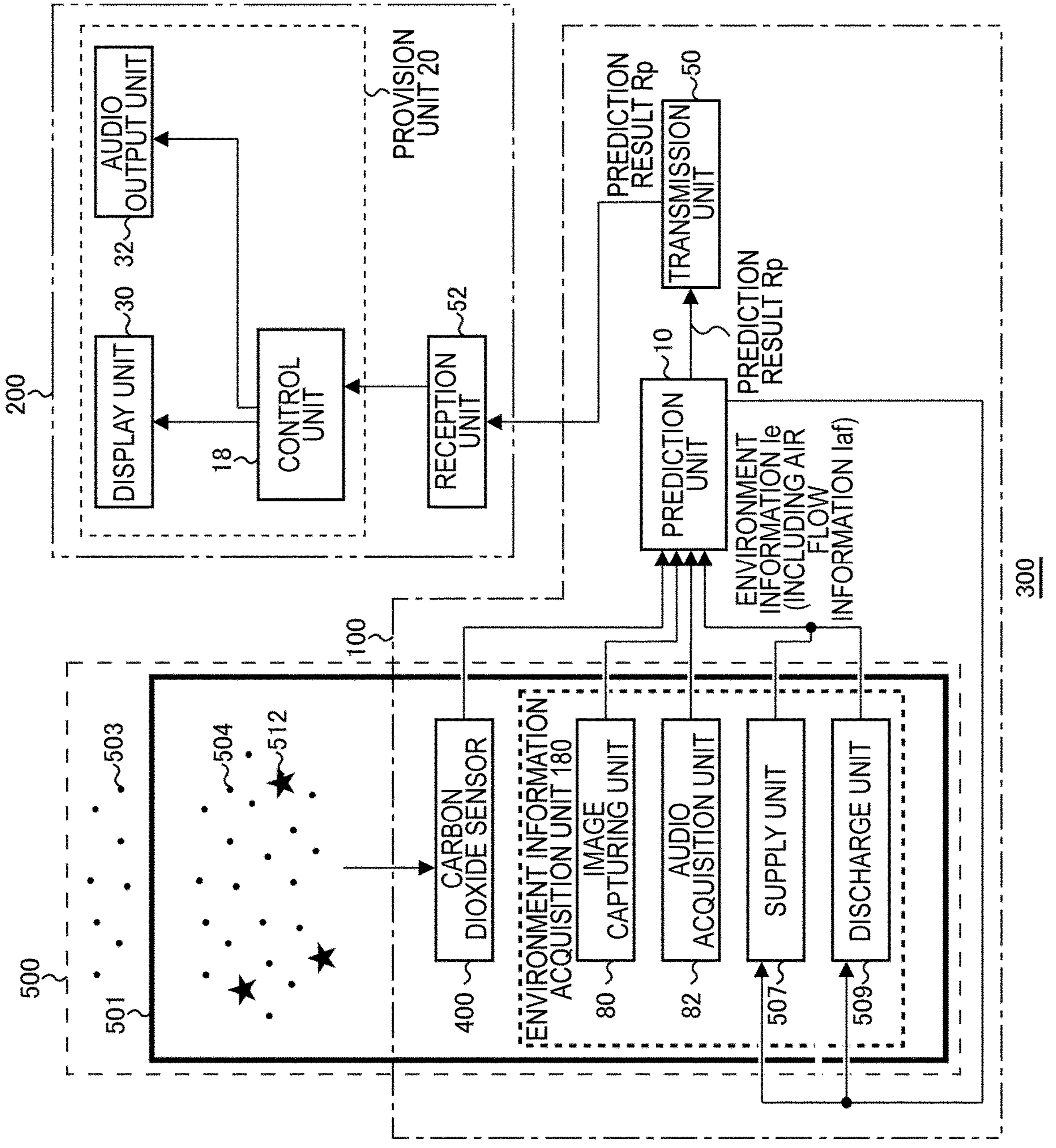
FIG. 13 is a block diagram illustrating another example of the carbon dioxide concentration prediction system 300 according to an embodiment of the present invention.

FIG. 13 is a block diagram illustrating another example of the carbon dioxide concentration prediction system 300 according to an embodiment of the present invention. In the present example, the environment information Ie further includes air flow information in the internal space 508. The air flow information is set as air flow information Iaf. The air flow information Iaf is information of equipment affecting an air flow of the internal space 508. The air flow information Iaf may include at least one of information of the supply unit 507 (see FIG. 1) or information of the exhaust unit 509 (see FIG. 1).

The information of the supply unit 507 (see FIG. 1) may refer to a volume or a mass of the external gas 503 supplied per unit time by the supply unit 507. The volume or mass of the external gas 503 supplied by the supply unit 507 may refer to a volume or a mass of the external gas 503 actually supplied by the supply unit 507. The volume or the mass of the external gas 503 supplied by the supply unit 507 may refer to a general volume or a general mass of the external gas 503 supplied by the supply unit 507. The general volume or mass may be a specification value of the volume or the mass of the external gas 503 supplied by the supply unit 507. The information of the supply unit 507 may refer to location information of the supply unit 507 in the internal space 508. The information of the supply unit 507 is set as supply unit information Isp.

The information of the exhaust unit 509 (see FIG. 1) may refer to a volume or a mass of the internal gas 504 evacuated per unit time by the exhaust unit 509. The volume or the mass of the internal gas 504 evacuated by the exhaust unit 509 may refer to a volume or a mass of the internal gas 504 actually evacuated by the exhaust unit 509. The volume or the mass of the internal gas 504 evacuated by the exhaust unit 509 may refer to a general volume or a general mass of the internal gas 504 evacuated by the exhaust unit 509. The general volume or mass may be a specification value of the volume or the mass of the internal gas 504 evacuated by the exhaust unit 509. The information of the exhaust unit 509 may refer to location information of the exhaust unit 509 in the internal space 508. The information of the exhaust unit 509 is set as exhaust unit information Iex.

The prediction unit 10 may predict the $CO_2$ (carbon dioxide) concentration in a current operation state of the supply unit 507 and the exhaust unit 509. The $CO_2$ (carbon dioxide) concentration is set as a first concentration Cf1. The first concentration Cf1 may be a $CO_2$ (carbon dioxide) concentration in a state in which the supply unit 507 and the exhaust unit 509 are not operated. The state in which the supply unit 507 and the exhaust unit 509 are not operated may refer to a state in which machine ventilation is not conducted in the internal space 508. The state in which machine ventilation is not conducted in the internal space 508 may refer to a state in which human-induced ventilation by operating at least one of the supply unit 507 or the exhaust unit 509 or the like is not conducted. The state in which machine ventilation is not conducted in the internal space 508 may include a state in which natural ventilation such as ventilation through a gap such as a window provided in the room 501 (see FIG. 1) is conducted.

The prediction unit 10 may predict the $CO_2$ (carbon dioxide) concentration in a case where at least one of the supply unit 507 or the exhaust unit 509 has changed from the current operation state. The $CO_2$ (carbon dioxide) concentration is set as a second concentration Cf2. The second concentration Cf2 may be a $CO_2$ (carbon dioxide) concentration in a state in which at least one of the supply unit 507 or the exhaust unit 509 is operated. The state in which at least one of the supply unit 507 or the exhaust unit 509 is operated may refer to a state in which ventilation is conducted in the internal space 508.

A case where at least one of the supply unit 507 or the exhaust unit 509 has changed from the current operation state may include a case where the operation state of at least one of the supply unit 507 or the exhaust unit 509 increases as compared with the current operation state and a case where the operation state of at least one of the supply unit 507 or the exhaust unit 509 decreases as compared with the current operation state. The state in which the operation state of the supply unit 507 increases or decreases respectively refers to a state in which a flow rate of gas supplied per unit time by the supply unit 507 increases and decreases. The state in which the operation state of the exhaust unit 509 increases and decreases respectively refers to a state in which a flow rate of gas evacuated per unit time by the exhaust unit 509 increases and decreases.

The provision unit 20 may provide at least one of the first concentration Cf1 or the second concentration Cf2. The provision unit 20 may provide the current $CO_2$ (carbon dioxide) concentration (the concentration Cp), the first concentration Cf1, and the second concentration Cf2. In this manner, the user of the carbon dioxide concentration prediction system 300 can previously recognize, at the clock time t2, the $CO_2$ (carbon dioxide) concentration (the first concentration Cf1) at the clock time tf (see FIG. 3 to FIG. 6) in a case where the supply unit 507 and the exhaust unit 509 are not in the operation state during the time Tf (see FIG. 3 to FIG. 6) and the $CO_2$ (carbon dioxide) concentration (the second concentration Cf2) at the clock time tf in a case where the supply unit 507 and the exhaust unit 509 are in the operation state during the time Tf.

When the first concentration Cf1 is higher than or equal to the threshold concentration Cth, the provision unit 20 may provide information for recommending that at least one of the supply unit 507 or the exhaust unit 509 is to be operated. The information may be displayed on the display unit 30, or may be output from the audio output unit 32. The indication of the black dot illustrated in FIG. 7 and FIG. 8, the hatching illustrated in FIG. 9, and the text illustrated in FIG. 10 are examples of the information for recommending that at least one of the supply unit 507 or the exhaust unit 509 is to be operated.

In the examples illustrated in FIG. 7 to FIG. 10 and FIG. 12, the concentration Cp, the first concentration Cf1, and the second concentration Cf2 may be displayed on the display unit 30. In the example illustrated in FIG. 11, the concentration Cp, the first concentration Cf1, and the second concentration Cf2 may be output from the audio output unit 32.

The prediction unit 10 may control at least one of the supply unit 507 or the exhaust unit 509 based on the predicted second concentration Cf2 such that the $CO_2$ (carbon dioxide) concentration of the internal space 508 becomes lower than or equal to the threshold concentration Cth. In this manner, the $CO_2$ (carbon dioxide) concentration of the internal space 508 tends to be maintained to be lower than or equal to the threshold concentration Cth.

Figure 14:
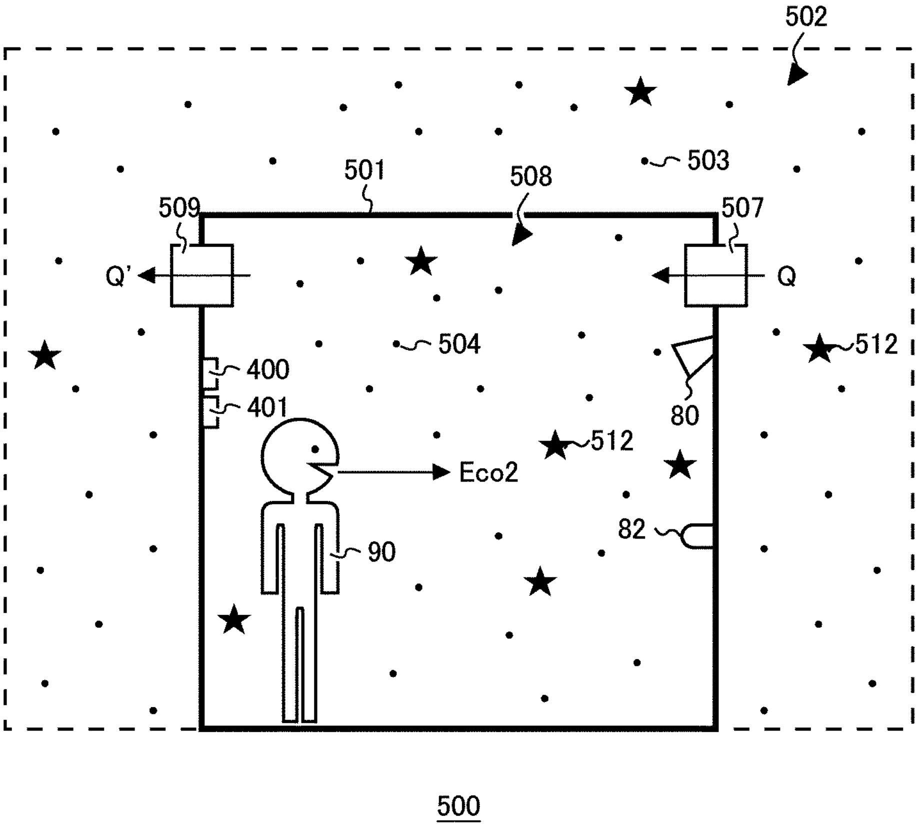
FIG. 14 illustrates another example of the prediction target 500 according to an embodiment of the present invention.

FIG. 14 illustrates another example of the prediction target 500 according to an embodiment of the present invention. In the present example, a temperature and humidity sensor 401 is further arranged in the internal space 508. The present example is different from the prediction target 500 illustrated in FIG. 1 in the above described aspect. The temperature and humidity sensor 401 is configured to measure a temperature and a humidity of the internal space 508.

The environment information Ie may further include at least one of the temperature or the humidity of the internal space 508. The temperature is set as a temperature T. The humidity is set as a humidity H. The temperature T and the humidity H may be measured by the temperature and humidity sensor 401.

A lifetime of the infectious source 512 may depend on at least one of the temperature T or the humidity H. When the infectious source 512 is a SARS-CoV-2 virus (so-called novel coronavirus), a lifetime of the infectious source 512 tends to be longer as a deviation from a predetermined range of the temperature T is larger. The lifetime of the infectious source 512 tends to be longer as a deviation from a predetermined range of the humidity H is larger. The predetermined range of the temperature T is, for example, 20° C. or higher and 25° C. or lower. The predetermined humidity H is, for example, a range of a relative humidity of 40% or higher and 60% or lower. The relative humidity refers to a ratio of water vapor contained in the air.

Figure 15:
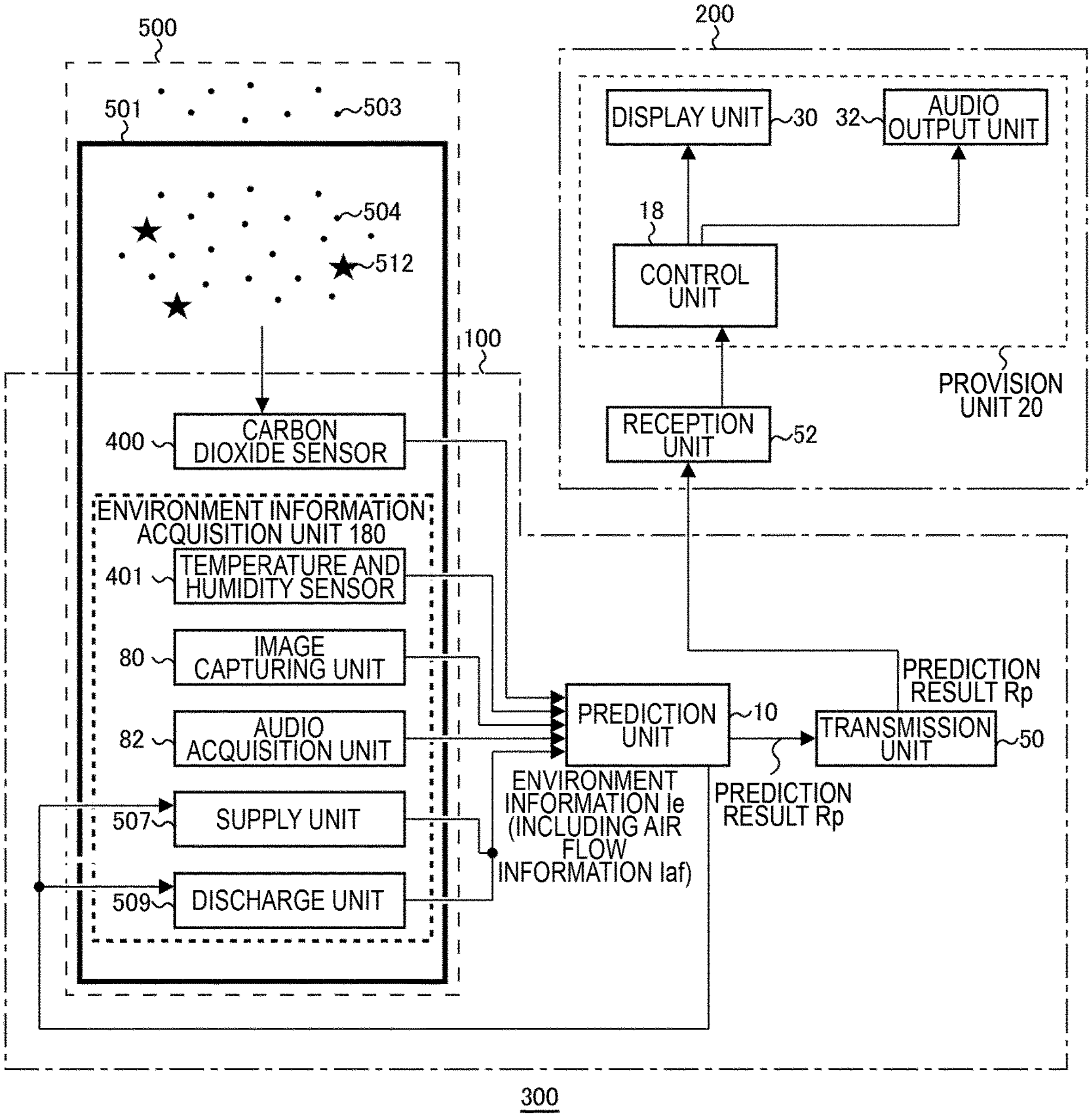
FIG. 15 is a block diagram illustrating another example of the carbon dioxide concentration prediction system 300 according to an embodiment of the present invention.

FIG. 15 is a block diagram illustrating another example of the carbon dioxide concentration prediction system 300 according to an embodiment of the present invention. In the present example, the carbon dioxide concentration prediction system 300 further includes the temperature and humidity sensor 401 (see FIG. 14). The present example is different from the carbon dioxide concentration prediction system 300 illustrated in FIG. 13 in the above described aspect. The environment information acquisition unit 180 may further include the temperature and humidity sensor 401.

The prediction unit 10 may predict at least one of the temperature T or the humidity H of the internal space 508 based on at least one of the current temperature T or the current humidity H in the internal space 508. The prediction unit 10 may predict at least one of the temperature T or the humidity H of the internal space 508 based on at least one of the current temperature T or the current humidity H in the internal space 508 and at least one of the information related to the $CO_2$ (carbon dioxide) concentration or the information related to the living subject 90 (see FIG. 1). The temperature T and the humidity H which are predicted by the prediction unit 10 may be respectively the temperature T and the humidity H at the clock time tf (see FIG. 3 to FIG. 6).

The prediction unit 10 may predict at least one of the temperature T or the humidity H of the internal space 508 based on at least one of the current temperature T or the current humidity H in the internal space 508. The prediction unit 10 may predict at least one of the temperature T or the humidity H of the internal space 508 in the current operation state of at least one the supply unit 507 or the exhaust unit 509 based on at least one of the current temperature T or the current humidity H in the internal space 508. The temperature T and the humidity H are respectively set as a first temperature Temp1 and a first humidity H1. The first temperature Temp1 and the first humidity H1 may be respectively the temperature T and the humidity H in a state in which at least one of the supply unit 507 or the exhaust unit 509 is not operated.

The prediction unit 10 may predict at least one of the temperature T or the humidity H of the internal space 508 in a case where the supply unit 507 and the exhaust unit 509 have changed from the current operation state based on at least one of the current temperature T or the current humidity H in the internal space 508. The temperature T and the humidity H are respectively set as a second temperature Temp2 and a second humidity H2. The second temperature Temp2 and the second humidity H2 may be respectively the temperature T and the humidity H in a state in which at least one of the supply unit 507 or the exhaust unit 509 is operated.

The provision unit 20 may further provide at least one of the temperature T or the humidity H of the internal space 508. The provision unit 20 may further provide at least one of the first temperature Temp1 or the first humidity H1 of the internal space 508 which is predicted by the prediction unit 10. The provision unit 20 may further provide at least one of the second temperature Temp2 or the second humidity H2 of the internal space 508 which is predicted by the prediction unit 10. In this manner, the user of the carbon dioxide concentration prediction system 300 can previously recognize, at the clock time t2, at least one of the first temperature Temp1 or the first humidity H1 at the clock time tf and at least one of the second temperature Temp2 or the second humidity H2 at the clock time tf.

In the examples illustrated in FIG. 7 to FIG. 10 and FIG. 12, the first temperature Temp1, the first humidity H1, the second temperature Temp2, and the second humidity H2 may be displayed on the display unit 30. In the example illustrated in FIG. 11, the first temperature Temp1, the first humidity H1, the second temperature Temp2, and the second humidity H2 may be output from the audio output unit 32.

When it is predicted that the first temperature Temp1 is not in a predetermined range of the temperature T, the provision unit 20 may provide information for recommending that at least one of the supply unit 507 or the exhaust unit 509 is to be operated. The information may be displayed on the display unit 30, or may be output from the audio output unit 32.

Figure 16:
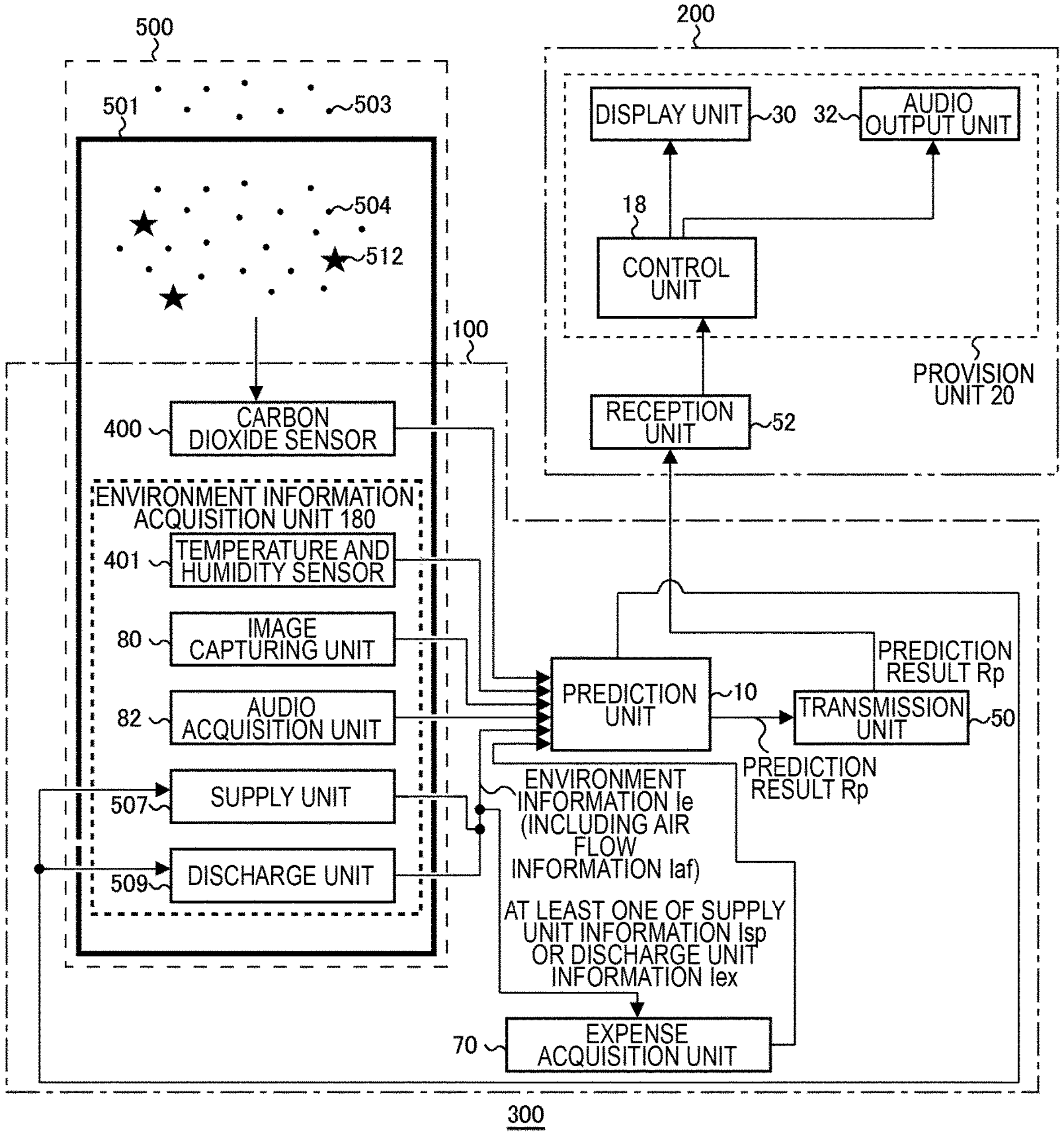
FIG. 16 is a block diagram illustrating another example of the carbon dioxide concentration prediction system 300 according to an embodiment of the present invention.

FIG. 16 is a block diagram illustrating another example of the carbon dioxide concentration prediction system 300 according to an embodiment of the present invention. The present example is different from the carbon dioxide concentration prediction system 300 illustrated in FIG. 15 in an aspect that the carbon dioxide concentration prediction system 300 further includes an expense acquisition unit 70. In the present example, the carbon dioxide concentration prediction apparatus 100 includes the expense acquisition unit 70.

The supply unit information Isp and the exhaust unit information Iex may include an expense from the operation of the supply unit 507 and the exhaust unit 509. The expense is set as an expense Ex. When the supply unit 507 is air conditioning equipment, the expense Ex from the operation of the supply unit 507 may be an electricity cost from an operation of the air conditioning equipment. When the exhaust unit 509 is a ventilation fan, the expense Ex from the operation of the exhaust unit 509 may be an electricity cost from an operation of the ventilation fan. In the present example, the expense acquisition unit 70 is configured to acquire at least one of the supply unit information Isp or the exhaust unit information Iex.

The prediction unit 10 may further predict the expense Ex. The prediction unit 10 may predict the expense Ex in a case where the $CO_2$ (carbon dioxide) concentration is the second concentration Cf2. The expense Ex in a case where the $CO_2$ (carbon dioxide) concentration is the second concentration Cf2 may include a case where the operation state of at least one of the supply unit 507 or the exhaust unit 509 increases as compared with the current operation state and a case where the operation state of at least one of the supply unit 507 or the exhaust unit 509 decreases as compared with the current operation state. When the operation state of at least one of the supply unit 507 or the exhaust unit 509 decreases as compared with the current operation state, the expense Ex from the operation of the supply unit 507 and the exhaust unit 509 which is predicted by the prediction unit 10 may be less than the expense Ex from the current operation state of the supply unit 507 and the exhaust unit 509.

The prediction unit 10 may predict the expense Ex based on the supply unit information Isp and the exhaust unit information Iex which are acquired by the expense acquisition unit 70. The prediction unit 10 may predict the expense Ex at the clock time tf (FIG. 3 to FIG. 6) in a case where the supply unit 507 and the exhaust unit 509 are put into the operation state during the time Tf (see FIG. 3 to FIG. 6). The prediction unit 10 may predict at least one of the first concentration Cf1, the second concentration Cf2, or the expense Ex in a case where the $CO_2$ (carbon dioxide) concentration is the second concentration Cf2.

The provision unit 20 may further provide the expense Ex. The provision unit 20 may provide the expense Ex in a state in which at least one of the supply unit 507 or the exhaust unit 509 is in the operation state. In this manner, the user of the carbon dioxide concentration prediction system 300 can previously recognize, at the clock time t2, the expense Ex at the clock time tf in a case where the supply unit 507 and the exhaust unit 509 are in the operation state during the time Tf (see FIG. 3 to FIG. 6).

In addition to the supply unit 507 and the exhaust unit 509, equipment that is not involved in the supply of the external gas 503 to the internal space 508 and the evacuation of the internal gas 504 to the external space 502 may be provided in the room 501 (see FIG. 1). The equipment is, for example, an air cleaner. The expense Ex may further include an expense from an operation of the equipment. An expense further including the expense from the operation of the equipment is set as an expense Ex'.

The prediction unit 10 may further predict the expense Ex'. The prediction unit 10 may predict the expense Ex' in a state in which at least one of the supply unit 507 or the exhaust unit 509 is operated and also the equipment described above is operated. The provision unit 20 may further provide the expense Ex'. The provision unit 20 may provide the expense Ex' in a state in which at least one of the supply unit 507 or the exhaust unit 509 is operated and also the equipment described above is operated.

In the examples illustrated in FIG. 7 to FIG. 10 and FIG. 12, the expense Ex may be displayed on the display unit 30. In the example illustrated in FIG. 11, the expense Ex may be output from the audio output unit 32.

The prediction unit 10 may predict the expense Ex in a state in which the supply unit 507 and the exhaust unit 509 are not operated. The expense Ex is set as an expense Ex1. The prediction unit 10 may predict the expense Ex in a state where one of the supply unit 507 or the exhaust unit 509 is operated. The expense Ex is set as an expense Ex2. The prediction unit 10 may predict the expense Ex in a state in which both the supply unit 507 and the exhaust unit 509 are operated. The expense Ex is set as an expense Ex3.

The provision unit 20 may provide the expense Ex1, the expense Ex2, and the expense Ex3. In this manner, the user of the carbon dioxide concentration prediction system 300 can previously recognize, at the clock time t2, the expense Ex1, the expense Ex2, and the expense Ex3 at the clock time tf, and can also compare the expense Ex1, the expense Ex2, and the expense Ex3.

The prediction unit 10 may predict the $CO_2$ (carbon dioxide) concentration of the internal space 508 and the expense Ex for each of operation states of at least one of the supply unit 507 or the exhaust unit 509. When the supply unit 507 is air conditioning equipment, the operation state of the supply unit 507 may refer to an operation mode of the air conditioning equipment. The operation mode refers to an eco mode, a standard mode, a premium mode, or the like. When the supply unit 507 is air conditioning equipment, for example, the prediction unit 10 predicts the $CO_2$ (carbon dioxide) concentration of the internal space 508 and the expense Ex for each of the operation modes of the air conditioning equipment.

The provision unit 20 may provide the $CO_2$ (carbon dioxide) concentration of the internal space 508 and the expense Ex which are predicted by the prediction unit 10 for each of the operation states. In this manner, when the supply unit 507 is air conditioning equipment, the user of the carbon dioxide concentration prediction system 300 can recognize the $CO_2$ (carbon dioxide) concentration and the expense Ex in each of a case where the air conditioning equipment is in the eco mode, a case where the air conditioning equipment is in the standard mode, and a case where the air conditioning equipment is in the premium mode.

In the examples illustrated in FIG. 7 to FIG. 10 and FIG. 12, the $CO_2$ (carbon dioxide) concentration and the expense Ex may be displayed on the display unit 30 for each of the operation states of at least one of the supply unit 507 or the exhaust unit 509. In the example illustrated in FIG. 11, the $CO_2$ (carbon dioxide) concentration and the expense Ex may be output from the audio output unit 32 for each of the operation states of at least one of the supply unit 507 or the exhaust unit 509.

Figure 17:
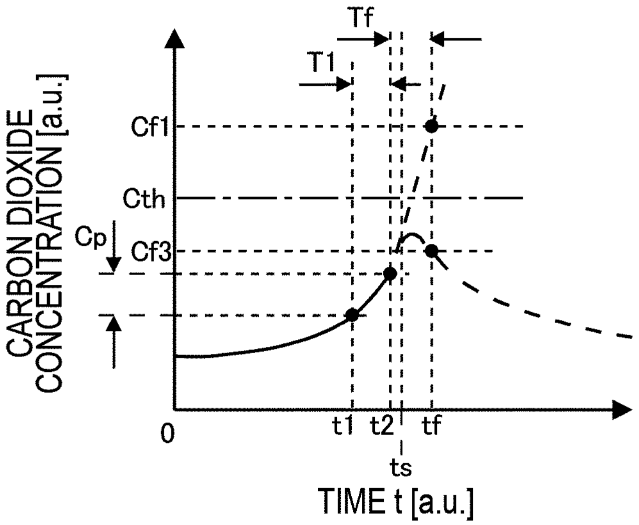
FIG. 17 illustrates another example of the relationship between the $CO_2$ (carbon dioxide) concentration of the internal space 508 which is measured by the $CO_2$ (carbon dioxide) sensor 400 and the time t.

FIG. 17 illustrates another example of the relationship between the $CO_2$ (carbon dioxide) concentration of the internal space 508 (see FIG. 1) which is measured by the $CO_2$ (carbon dioxide) sensor 400 (see FIG. 1) and the time t. It is set in the present example that the supply unit 507 and the exhaust unit 509 are not in the operation state during the time T1. In the present example, a clock time ts is a clock time at which the supply unit 507 and the exhaust unit 509 start to operate, where the clock time ts is one clock time from the clock time t2 to the clock time tf. During a time at and after the clock time ts, the $CO_2$ (carbon dioxide) concentration of the internal space 508 tends to fall.

The prediction unit 10 (see FIG. 16) may further predict operation start timing of at least one of the supply unit 507 (see FIG. 1) or the exhaust unit 509 (see FIG. 1) based on the current $CO_2$ (carbon dioxide) concentration (the concentration Cp) and the first concentration Cf1. In the present example, the operation start timing is the clock time ts. In the present example, the first concentration Cf1 is higher than the threshold concentration Cth.

The prediction unit 10 (see FIG. 16) may further predict a $CO_2$ (carbon dioxide) concentration in a case where the supply unit 507 (see FIG. 1) and the exhaust unit 509 (see FIG. 1) start to operate at the clock time ts. The $CO_2$ (carbon dioxide) concentration is set as a third concentration Cf3. The third concentration Cf3 may be a $CO_2$ (carbon dioxide) concentration at the clock time tf. The third concentration Cf3 tends to be lower than the first concentration Cf1.

The provision unit 20 (see FIG. 16) may further provide at least one of the clock time ts or the third concentration Cf3. In this manner, the user of the carbon dioxide concentration prediction system 300 can previously recognize, at the clock time t2, the clock time ts and the third concentration Cf3.

In the examples illustrated in FIG. 7 to FIG. 10 and FIG. 12, at least one of the clock time ts or the third concentration Cf3 may be displayed on the display unit 30. In the example illustrated in FIG. 11, at least one of the clock time ts or the third concentration Cf3 may be output from the audio output unit 32.

Figure 18:
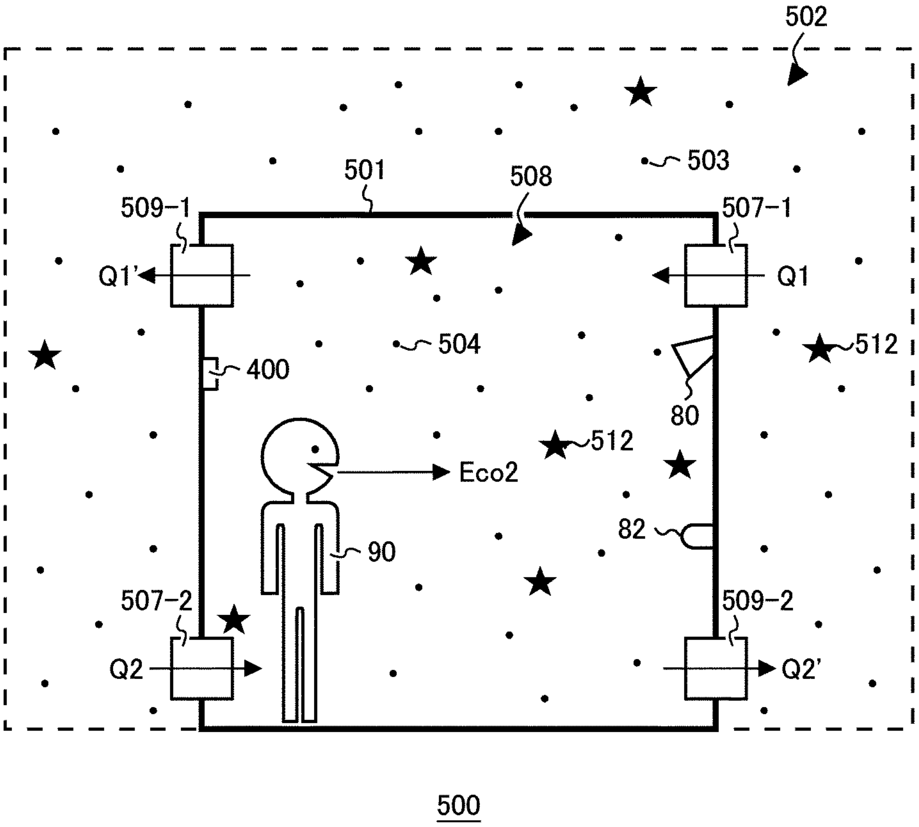
FIG. 18 illustrates another example of the prediction target 500 according to an embodiment of the present invention.

FIG. 18 illustrates another example of the prediction target 500 according to an embodiment of the present invention. At least one of a plurality of supply units 507 or a plurality of exhaust units 509 may be provided in the room 501. In the present example, both the plurality of supply units 507 and the plurality of exhaust units 509 are provided in the room 501. In the present example, in the room 501, two supply unit 507 (a supply unit 507-1 and a supply unit 507-2) are provided, and two exhaust units 509 (an exhaust unit 509-1 and an exhaust unit 509-2) are provided.

The plurality of supply units 507 may be supply units 507 with mutually different types. The types of the supply unit 507 may refer to a volume or a mass of the internal gas 504 evacuated per unit time, or may refer to power consumption of the supply unit 507. The same also applies to the plurality of exhaust units 509.

Figure 19:
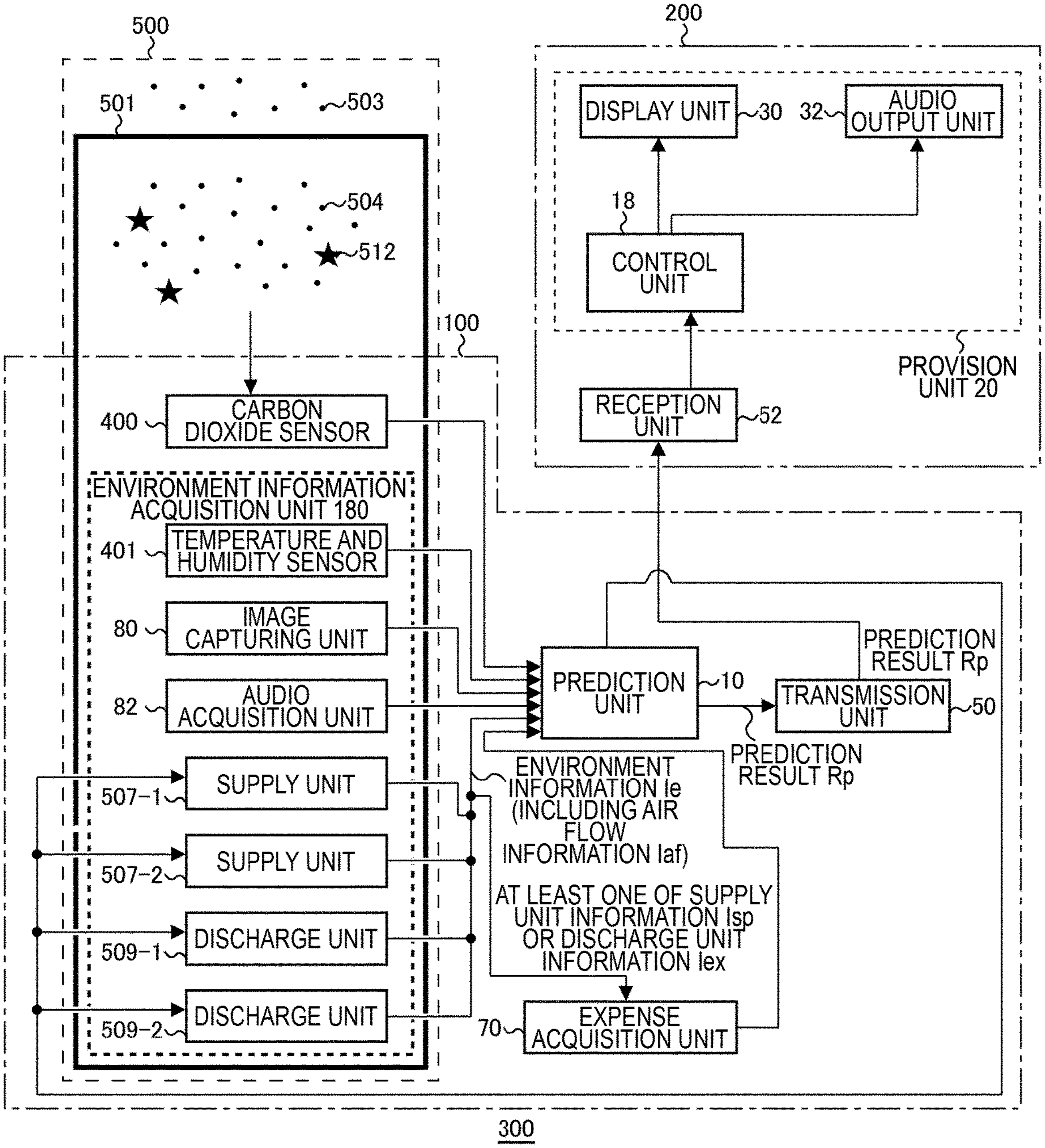
FIG. 19 is a block diagram illustrating another example of the carbon dioxide concentration prediction system 300 according to an embodiment of the present invention.

FIG. 19 is a block diagram illustrating another example of the carbon dioxide concentration prediction system 300 according to an embodiment of the present invention. The air flow information Iaf includes at least one of information of the plurality of supply units 507 (see FIG. 1) or information of the plurality of exhaust units 509 (see FIG. 1). In the present example, the air flow information Iaf includes at least one of information of the two supply units 507 or information of the two exhaust units 509.

The information of the supply unit 507 may be information related to a type of the supply unit 507. The information related to the type of the supply unit 507 refers to, for example, a performance, a specification, or the like of the supply unit 507. The same also applies to the information of the exhaust unit 509.

When the air flow information Iaf includes the information of the plurality of supply units 507, the prediction unit 10 may predict the second concentration Cf2 for each of the plurality of supply units 507. The prediction unit 10 may predict the second concentration Cf2 in a state in which each of the plurality of supply units 507 is operated for each of the plurality of supply units 507. The prediction unit 10 may predict the second concentration Cf2 in a state in which the supply unit 507-1 is operated and the supply unit 507-2 is not operated and may predict the second concentration Cf2 in a state in which the supply unit 507-2 is operated and the supply unit 507-1 is not operated. The prediction unit 10 may predict the second concentration Cf2 in a state in which the supply unit 507-1 and the supply unit 507-2 operate.

The provision unit 20 may provide a second concentration Cf for each of the plurality of supply units 507 which is predicted by the prediction unit 10. In this manner, the user of the carbon dioxide concentration prediction system 300 can previously recognize, at the clock time t2, the second concentration Cf2 in a state in which one supply unit 507 among the plurality of supply units 507 is operated for each of the supply units 507. In this manner, the user of the carbon dioxide concentration prediction system 300 can select, for example, the supply unit 507 with which the second concentration Cf2 becomes lower than the threshold concentration Cth.

In the examples illustrated in FIG. 7 to FIG. 10 and FIG. 12, the second concentration Cf2 may be displayed on the display unit 30 for each of the supply units 507. In the example illustrated in FIG. 11, the second concentration Cf2 for each of the supply units 507 which is supplied from the audio output unit 32 may be output.

When the air flow information Iaf includes the information of the plurality of exhaust units 509, the prediction unit 10 may predict the second concentration Cf2 for each of the plurality of exhaust units 509. The prediction unit 10 may predict the second concentration Cf2 in which each of the plurality of exhaust units 509 is in the operation state for each of the plurality of exhaust units 509. The prediction unit 10 may predict the second concentration Cf2 in a state in which the exhaust unit 509-1 is operated and the exhaust unit 509-2 is not operated, and may predict the second concentration Cf2 in a state in which the exhaust unit 509-2 is operated and the exhaust unit 509-1 is not operated. The prediction unit 10 may predict the second concentration Cf2 in a state in which the exhaust unit 509-1 and the exhaust unit 509-2 are operated.

The provision unit 20 may provide the second concentration Cf2 for each of the plurality of exhaust units 509 which is predicted by the prediction unit 10. Among the second concentration Cf2 for each of the plurality of exhaust units 509, the provision unit 20 may provide information of the exhaust unit 509 with which the second concentration Cf2 becomes the lowest. The information of the exhaust unit 509 is, for example, information for recommending the exhaust unit 509 with which the second concentration Cf2 becomes the lowest.

The prediction unit 10 may predict at least one of the supply amount Q of the external gas 503 (see FIG. 1) or the exhaust amount Q' of the internal gas 504 (see FIG. 1) based on the $CO_2$ (carbon dioxide) concentration in the prediction target 500 (see FIG. 1). In the present example, the prediction unit 10 predicts at least one of the supply amount Q or the exhaust amount Q' based on the $CO_2$ (carbon dioxide) concentration in the internal space 508. The provision unit 20 may provide at least one of the supply amount Q or the exhaust amount Q' which is predicted by the prediction unit 10.

The $CO_2$ (carbon dioxide) concentration in the prediction target 500 may refer to a current $CO_2$ (carbon dioxide) concentration in the prediction target 500. The current $CO_2$ (carbon dioxide) concentration may refer to the $CO_2$ (carbon dioxide) concentration (the concentration Cp) during the time T1 in FIG. 3 to FIG. 6 and FIG. 17 as described above. The $CO_2$ (carbon dioxide) concentration in the prediction target 500 may refer to a change over time of the $CO_2$ (carbon dioxide) concentration in the prediction target 500. In the present example, at least one of the supply amount Q or the exhaust amount Q' at the clock time tf is predicted based on the $CO_2$ (carbon dioxide) concentration during the time T1. The prediction unit 10 may predict at least one of the supply amount Q or the exhaust amount Q' by Expression 2 described above.

Performance of the supply unit 507 may deviate from a specification of the supply unit 507 with elapse of the operation time. For example, with elapse of the operation time, supply performance of the supply unit 507 may fall due to contamination of a filter provided in the supply unit 507. When the supply performance of the supply unit 507 falls, the supply amount Q may fall. The same also applies to the exhaust amount Q'.

A predetermined supply amount Q of the supply unit 507 is set as a supply amount Qp. The supply amount Qp may be a supply amount defined by the specification of the supply unit 507. A supply amount Q that has decreased from the supply amount Qp is set as a supply amount Qd. Similarly, a predetermined exhaust amount Q' of the exhaust unit 509 is set as an exhaust amount Qp'. An exhaust amount Q' that has decreased from the exhaust amount Qp' is set as an exhaust amount Qd'.

The prediction unit 10 may predict at least one of the supply amount Qd or the exhaust amount Qd' based on the $CO_2$ (carbon dioxide) concentration in the prediction target 500 (see FIG. 1). The provision unit 20 may provide at least one of the supply amount Qd or the exhaust amount Qd' which is predicted by the prediction unit 10.

When the supply amount Q falls in the example illustrated in FIG. 17, a deviation may occur between the $CO_2$ (carbon dioxide) concentration (the third concentration Cf3) at the clock time tf which is predicted by the prediction unit 10 and the actual $CO_2$ (carbon dioxide) concentration at the clock time tf. Thus, the third concentration Cf3 may exceed the threshold concentration Cth, for example. In the present example, since the provision unit 20 provides at least one of the supply amount Qd or the exhaust amount Qd', at least one of the supply amount Qd or the exhaust amount Qd' can be previously recognized at the clock time t2 (see FIG. 17).

In the examples illustrated in FIG. 7 to FIG. 10 and FIG. 12, at least one of the supply amount Qd or the exhaust amount Qd' may be displayed on the display unit 30. In the example illustrated in FIG. 11, at least one of the supply amount Qd or the exhaust amount Qd' may be output from the audio output unit 32.

The prediction unit 10 may further predict the $CO_2$ (carbon dioxide) concentration of the internal space 508 based on the current $CO_2$ (carbon dioxide) concentration (the concentration Cp), the environment information Ie, and at least one of the supply amount Q or the exhaust amount Q'. The prediction unit 10 may predict, by Expression 2 described above, the $CO_2$ (carbon dioxide) concentration of the internal space 508 based on the concentration Cp, the environment information Ie, and at least one of the supply amount Q or the exhaust amount Q'. The supply amount Q may be the supply amount Qd. The exhaust amount Q' may be the exhaust amount Qd'. In this manner, the prediction unit 10 can predict, at the clock time ts, the $CO_2$ (carbon dioxide) concentration in a case where the supply amount Q falls, and can predict, at the clock time ts, the $CO_2$ (carbon dioxide) concentration in a case where the exhaust amount Q' falls.

When the supply amount Qd becomes lower than or equal to a predetermined supply amount Q, the provision unit 20 may provide information for recommending cleaning of a filter of the supply unit 507. When the exhaust amount Qd' becomes lower than or equal to a predetermined exhaust amount Q', the provision unit 20 may provide information for recommending cleaning of a filter of the exhaust unit 509. In this manner, the user of the carbon dioxide concentration prediction system 300 can recognize timing at which at least one of the filter of the supply unit 507 or the filter of the exhaust unit 509 is to be cleaned.

As described above, the image capturing unit 80 is arranged in the internal space 508 (see FIG. 1). The arrangement of the image capturing unit 80 in the internal space 508 may refer to provision of the image capturing unit 80 in the internal space 508, and may refer to provision of the image capturing unit 80 in a mobile terminal possessed by the living subject 90 existing in the internal space 508.

The prediction unit 10 may predict a size of the internal space 508 based on an image of the internal space 508. FIG.

12 is an example of the image of the internal space 508. The image may be captured by the image capturing unit 80. The prediction unit 10 may predict the $CO_2$ (carbon dioxide) concentration of the internal space 508 further based on the predicted size of the internal space 508. The size of the internal space 508 may be the volume V in Expression 2 described above. The prediction unit 10 may predict the $CO_2$ (carbon dioxide) concentration of the internal space 508 by Expression 2.

The carbon dioxide concentration prediction system 300 may include the image capturing unit 80, or a configuration may also be adopted where the carbon dioxide concentration prediction system 300 does not include the image capturing unit 80. In the present example, the carbon dioxide concentration prediction system 300 includes the image capturing unit 80. When the carbon dioxide concentration prediction system 300 includes the image capturing unit 80, the carbon dioxide concentration prediction apparatus 100 or the terminal 200 may include the image capturing unit 80. In the present example, the carbon dioxide concentration prediction apparatus 100 includes the image capturing unit 80.

Figure 20:
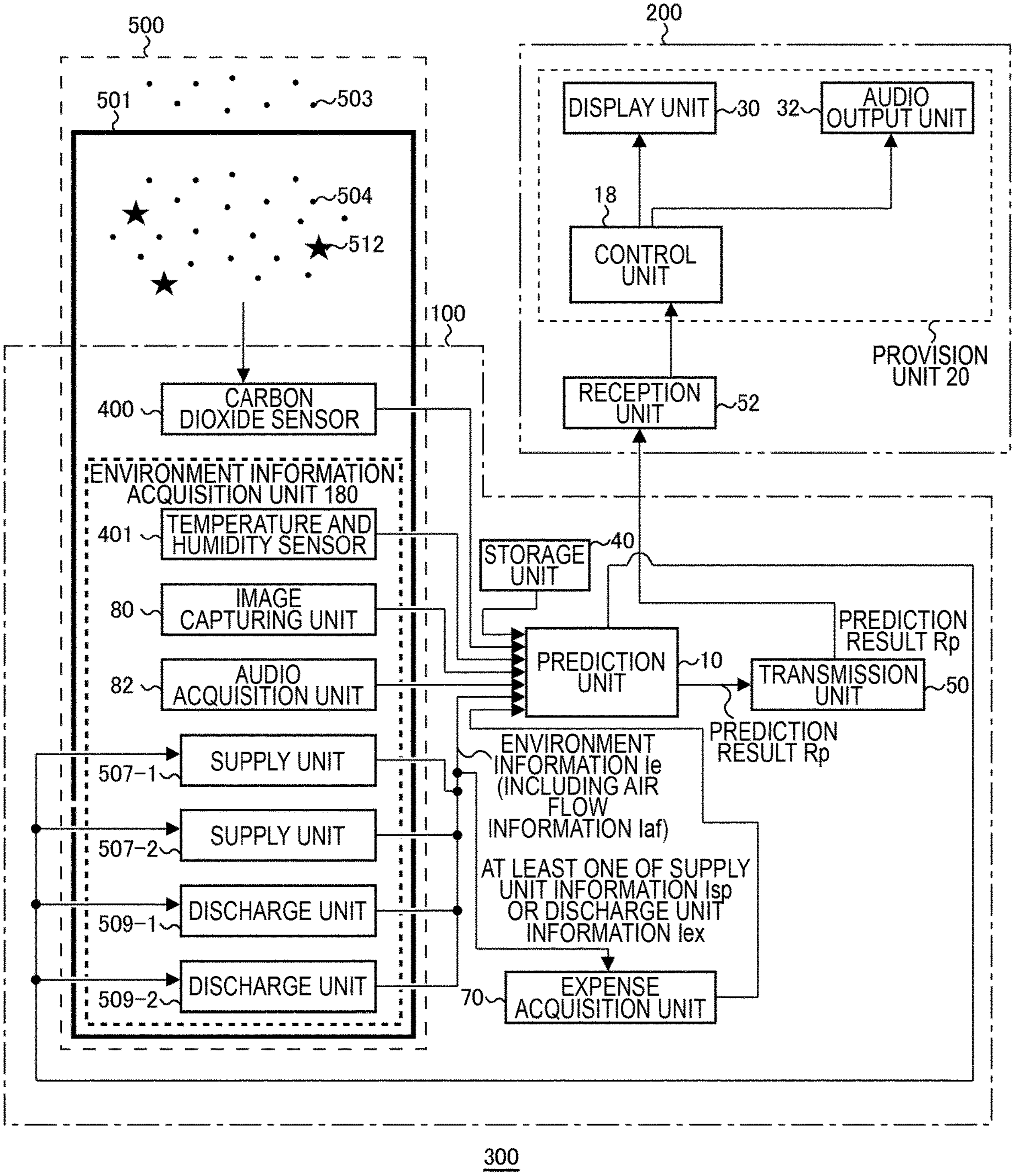
FIG. 20 is a block diagram illustrating another example of the carbon dioxide concentration prediction system 300 according to an embodiment of the present invention.

FIG. 20 is a block diagram illustrating another example of the carbon dioxide concentration prediction system 300 according to an embodiment of the present invention. In the present example, the carbon dioxide concentration prediction system 300 further includes the storage unit 40. The present example is different from the carbon dioxide concentration prediction system 300 illustrated in FIG. 19 in the above described aspect. In the present example, the carbon dioxide concentration prediction apparatus 100 includes the storage unit 40.

Number information of the living subject 90 is set as number information In. The number information In refers to a number of at least one living subject 90 existing in the internal space 508. The prediction unit 10 may predict the $CO_2$ (carbon dioxide) concentration of the internal space 508 based on the number information In. The living subject 90 exhausts $CO_2$ (carbon dioxide) by exhalation. Thus, the $CO_2$ (carbon dioxide) concentration of the internal space 508 tends to be higher as the number of the living subjects 90 existing in the internal space 508 is higher, and the carbon dioxide concentration tends to be higher as a density of the plurality of living subjects 90 is higher. Thus, the exhaust amount $E_{co2}$ of $CO_2$ (carbon dioxide) exhausted to the internal space 508 by the living subjects 90 may depend on the number information In.

Motion information of the living subject 90 existing in the internal space 508 is set as motion information Im. The motion information Im refers to motion information of the living subject 90 in the prediction target 500. The motion information Im may be information of metabolic equivalent of task (METs) or motion of the living subject 90. The metabolic equivalent of task (METs) is an amount obtained by normalizing an amount of $O_2$ (oxygen) consumed by the living subject 90 in a case where the living subject 90 is in a motion state by an amount of an amount of $O_2$ (oxygen) consumed by the living subject 90 in a case where the living subject 90 is in a rest state.

The prediction unit 10 may predict the $CO_2$ (carbon dioxide) concentration of the internal space 508 based on the motion information Im. When momentum of the living subject 90 increases, a cycle of exhalation of the living subject 90 tends to be shortened, and a total amount of exhalation of the living subject 90 during a predetermined time tends to increase. Thus, as the momentum of the living subject 90 increases, the $CO_2$ (carbon dioxide) concentration of the internal space 508 tends to increase. Thus, the exhaust amount $E_{co2}$ of $CO_2$ (carbon dioxide) exhausted to the internal space 508 by the living subject 90 may depend on the motion information Im.

A number of at least one living subject 90 existing in the internal space 508 is set as N. Momentum of the living subject 90 existing in the internal space 508 is set as M. "M" may be the metabolic equivalent of task (METs) described above. The exhaust amount $E_{co2}$ of $CO_2$ (carbon dioxide) exhausted by the living subject 90 to the internal space 508 is represented by the following expression 3.

(Expression. 3)

$$E_{co2}=N(M\times A_{co2}) \tag{3}$$

In Expression 3, $A_{CO2}$ denotes a proportional constant.

Figure 21:
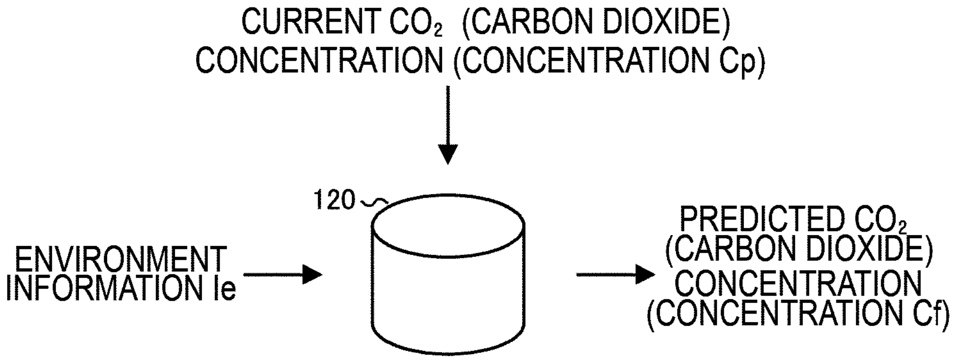
FIG. 21 illustrates an example of a prediction method of the $CO_2$ (carbon dioxide) concentration of the internal space 508.

FIG. 21 illustrates an example of a prediction method of the $CO_2$ (carbon dioxide) concentration of the internal space 508. When the current $CO_2$ (carbon dioxide) concentration (the concentration Cp) of the internal space 508 and the environment information Ie are input, a concentration inference model 120 is configured to output the $CO_2$ (carbon dioxide) concentration (the concentration Cf) predicted in relation to the concentration Cp and the environment information Ie. The prediction unit 10 may acquire the concentration Cf output by the concentration inference model 120.

The carbon dioxide concentration prediction system 300 may include the concentration inference model 120. The carbon dioxide concentration prediction apparatus 100 may include the concentration inference model 120. The concentration inference model 120 may be generated by machine learning of a relationship between the concentration Cp and the environment information Ie, and the concentration Cf. The concentration inference model 120 may be stored in the storage unit 40.

The prediction unit 10 may predict the $CO_2$ (carbon dioxide) concentration of the internal space 508 based on a stay plan of the living subject 90 in the internal space 508. The prediction unit 10 may compensate the exhaust amount $E_{co2}$ based on the stay plan of the living subject 90 in the internal space 508. The compensated exhaust amount $E_{co2}$ is set as an exhaust amount $E_{co2}'$. The prediction unit 10 may compensate the exhaust amount $E_{co2}$ while the living subject 90 stays in the internal space 508 based on the stay plan of the living subject 90 in the internal space 508. The prediction unit 10 may compensate the exhaust amount $E_{co2}$ while the living subject 90 stays in the internal space 508 by Expression 3.

The stay plan of the living subject 90 in the internal space 508 may be stored in the storage unit 40. The stay plan may refer to an action schedule of the living subject 90. The storage unit 40 may store a scheduled clock time at which the living subject 90 enters the internal space 508 from the outside of the internal space 508, a scheduled stay time in the internal space 508, a scheduled clock time at which the living subject 90 departs from the internal space 508 to the outside of the internal space 508, or the like.

The prediction unit 10 may predict the $CO_2$ (carbon dioxide) concentration of the internal space 508 based on the exhaust amount $E_{co2}'$. The predicted $CO_2$ (carbon dioxide) concentration is set as a concentration Ca1. The prediction unit 10 may predict, by Expression 2, the $CO_2$ (carbon dioxide) concentration (the concentration Cf (see FIG. 3 to FIG. 6 and FIG. 17)) in a case where the exhaust amount $E_{co2}$ in Expression 2 is the exhaust amount $E_{co2}'$ compensated by Expression 3. In this manner, the prediction unit 10 can predict the concentration Cf on which the stay plan of the living subject 90 in the internal space 508 has been reflected.

The prediction unit 10 may further predict the operation start timing (the clock time ts in FIG. 17) of at least one of the supply unit 507 (see FIG. 1) or the exhaust unit 509 (see FIG. 1) based on the current $CO_2$ (carbon dioxide) concentration (the concentration Cp (see FIG. 17)) and the concentration Ca1. The prediction unit 10 may further predict a fourth concentration Cf4 in a case where the operation of at least one of the supply unit 507 or the exhaust unit 509 is started at the clock time ts. The fourth concentration Cf4 may be the $CO_2$ (carbon dioxide) concentration at the clock time tf (see FIG. 17). The fourth concentration Cf4 may be different from the third concentration Cf3.

The provision unit 20 may further provide at least one of the clock time ts or the fourth concentration Cf4. In this manner, the user of the carbon dioxide concentration prediction system 300 can previously recognize, at the clock time t2, the clock time ts and the fourth concentration Cf4 on which the stay plan of the living subject 90 in the internal space 508 has been reflected.

The prediction unit 10 may acquire the number information In based on an image of the internal space 508 which is captured by the image capturing unit 80. The image may be a still image, or may be a moving image. The prediction unit 10 may acquire the number information In by an entry record to the internal space 508. The number information In may be manually input by the carbon dioxide concentration prediction system 300. The prediction unit 10 may acquire the motion information Im based on an image of the internal space 508 which is captured by the image capturing unit 80. The prediction unit 10 may predict the $CO_2$ (carbon dioxide) concentration of the internal space 508 based on the number information In and the motion information Im.

Figure 22:
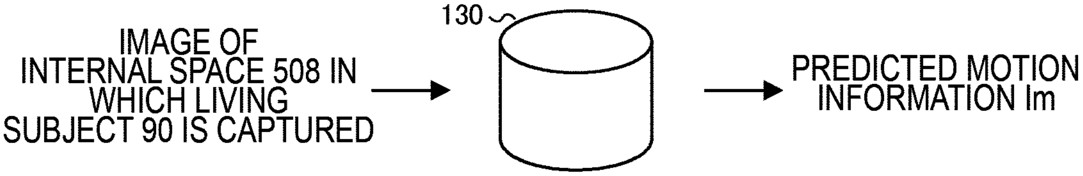
FIG. 22 illustrates an example of an acquisition method of motion information Im of a living subject 90.

FIG. 22 illustrates an example of an acquisition method of the motion information Im of the living subject 90. When an image of the internal space 508 in which the living subject 90 is captured is input, a motion information inference model 130 is configured to output the motion information Im predicted in relation to the image. A metabolic equivalent of task (METs) by each of activities is generally known where the metabolic equivalent of task (METs) of the living subject 90 is, for example, 3 METs when the living subject 90 is walking, is, for example, 4 METs when the living subject 90 is riding on a bicycle, and is, for example, 6 METs when the living subject 90 is jogging, etc. The prediction unit 10 may acquire the motion information Im output by the motion information inference model 130.

The motion information inference model 130 may be generated by machine learning of a relationship between the image of the internal space 508 in which the living subject 90 is captured and the motion information Im of the living subject 90. When an image of a state in which the living subject 90 is jogging is input, for example, the motion information inference model 130 may output 6 METs as the motion information Im. The motion information inference model 130 may be stored in the storage unit 40.

The prediction unit 10 may compensate the exhaust amount $E_{co2}$ based on the number information In and the motion information Im. The compensated exhaust amount $E_{co2}$ is set as an exhaust amount $E_{co2}$". The prediction unit 10 may compensate the exhaust amount $E_{co2}$ based on the number information In and the motion information Im which are based on an image captured by the image capturing unit 80. The prediction unit 10 may compensate the exhaust amount $E_{co2}$ by Expression 3 based on the number information In and the motion information Im.

The prediction unit 10 may predict the $CO_2$ (carbon dioxide) concentration of the internal space 508 based on the exhaust amount $E_{co2}$". The predicted $CO_2$ (carbon dioxide) concentration is set as a concentration Ca2. The prediction unit 10 may predict, by Expression 2, the concentration Cf (see FIG. 3 to FIG. 6 and FIG. 17) in a case where the exhaust amount $E_{co2}$ in Expression 2 which is compensated by Expression 3 is the exhaust amount $E_{co2}$. In this manner, the prediction unit 10 can predict the concentration Cf on which the number N and the momentum M of the living subject 90 have been reflected. Note that the number information In and the motion information Im may be stored in the storage unit 40.

When the prediction unit 10 acquires the number information In and the motion information Im based on the image captured by the image capturing unit 80, a configuration may be adopted where the carbon dioxide concentration prediction system 300 does not include the storage unit 40. The stay plan of the living subject 90 in the internal space 508 may change. Thus, in a case where the prediction unit 10 is to compensate the exhaust amount $E_{co2}$ by Expression 3, even when the stay plan of the living subject 90 changes, the prediction unit 10 is facilitated to accurately predict the $CO_2$ (carbon dioxide) concentration of the internal space 508.

The prediction unit 10 may acquire the motion information Im based on a sound of the living subject 90 which is acquired by the audio acquisition unit 82. The prediction unit 10 may acquire the motion information Im based on at least one of the image of the internal space 508 or the sound of the living subject 90. The sound of the living subject 90 may refer to a sound emitted from a sound producing organ (mainly, a mouth or a throat). Information of the sound of the living subject 90 may include at least one of a sound of a voice, a sound of a cough, or a sound of a sneeze which is emitted from the living subject 90. As the sound emitted from the living subject 90 is louder, the momentum M of the living subject 90 tends to be higher. Thus, the prediction unit 10 can acquire the motion information Im based on the sound of the living subject 90. Note that the prediction unit 10 may acquire the motion information Im based on the image of the internal space 508 and the sound of the living subject 90.

The information of the sound of the living subject 90 is set as sound information Iv. The sound information Iv may refer to at least one of a volume or a frequency of a sound emitted from the living subject 90, or may refer to a voiceprint of the living subject 90. The sound information Iv may include gender information of the sound of the living subject 90. The acquisition of the motion information Im based on the sound of the living subject 90 may refer to the motion information Im based on acquisition of the sound information Iv. Note that the sound information Iv may be stored in the storage unit 40.

Information of a sound other than the living subject 90 is set as sound information Iv'. The sound information Iv' may refer to at least one of a volume or a frequency of a sound generated from one other than the living subject 90, or may refer to a sound generated from a motion of the living subject 90. For example, when the living subject 90 exercises on a running machine, the sound information Iv' may include at least one of an operational sound of the running machine or a sound from a leg of the living subject 90 kicking a floor or the running machine.

Figure 23:
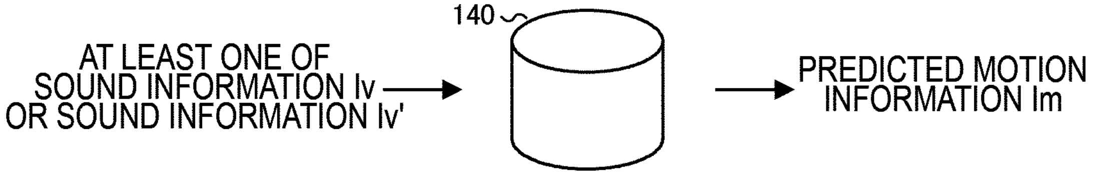
FIG. 23 illustrates another example of the acquisition method of the motion information Im of the living subject 90.

FIG. 23 illustrates another example of the acquisition method of the motion information Im of the living subject 90. When at least one of the sound information Iv or the sound information Iv' is input, a motion information inference model 140 is configured to output the motion information Im predicted in relation to at least one of the sound information Iv or the sound information Iv'. The prediction unit 10 may acquire the motion information Im output by the motion information inference model 140. The motion information inference model 140 may be generated by machine learning of a relationship between at least one of the sound information Iv or the sound information Iv' and the motion information Im of the living subject 90. The motion information inference model 140 may be stored in the storage unit 40.

The prediction unit 10 may compensate the exhaust amount $E_{co2}$ based on the number information In acquired based on the image of the internal space 508 and the motion information Im acquired based on the sound of the living subject 90. The prediction unit 10 may compensate the exhaust amount $E_{co2}$ by Expression 3 based on the number information In and the motion information Im.

The prediction unit 10 may further predict the operation start timing (the clock time ts in FIG. 17) of at least one of the supply unit 507 (see FIG. 1) or the exhaust unit 509 (see FIG. 1) based on the current $CO_2$ (carbon dioxide) concentration (the concentration Cp (see FIG. 17)) and the concentration Ca2. The prediction unit 10 may further predict the fourth concentration Cf4 in a case where the operation of at least one of the supply unit 507 or the exhaust unit 509 is started at the clock time ts.

The provision unit 20 may further provide at least one of the clock time ts or the fourth concentration Cf4. In this manner, the user of the carbon dioxide concentration prediction system 300 can recognize the clock time ts and the fourth concentration Cf4 on which a stay situation of the living subject 90 in the internal space 508 has been reflected.

Figure 24:
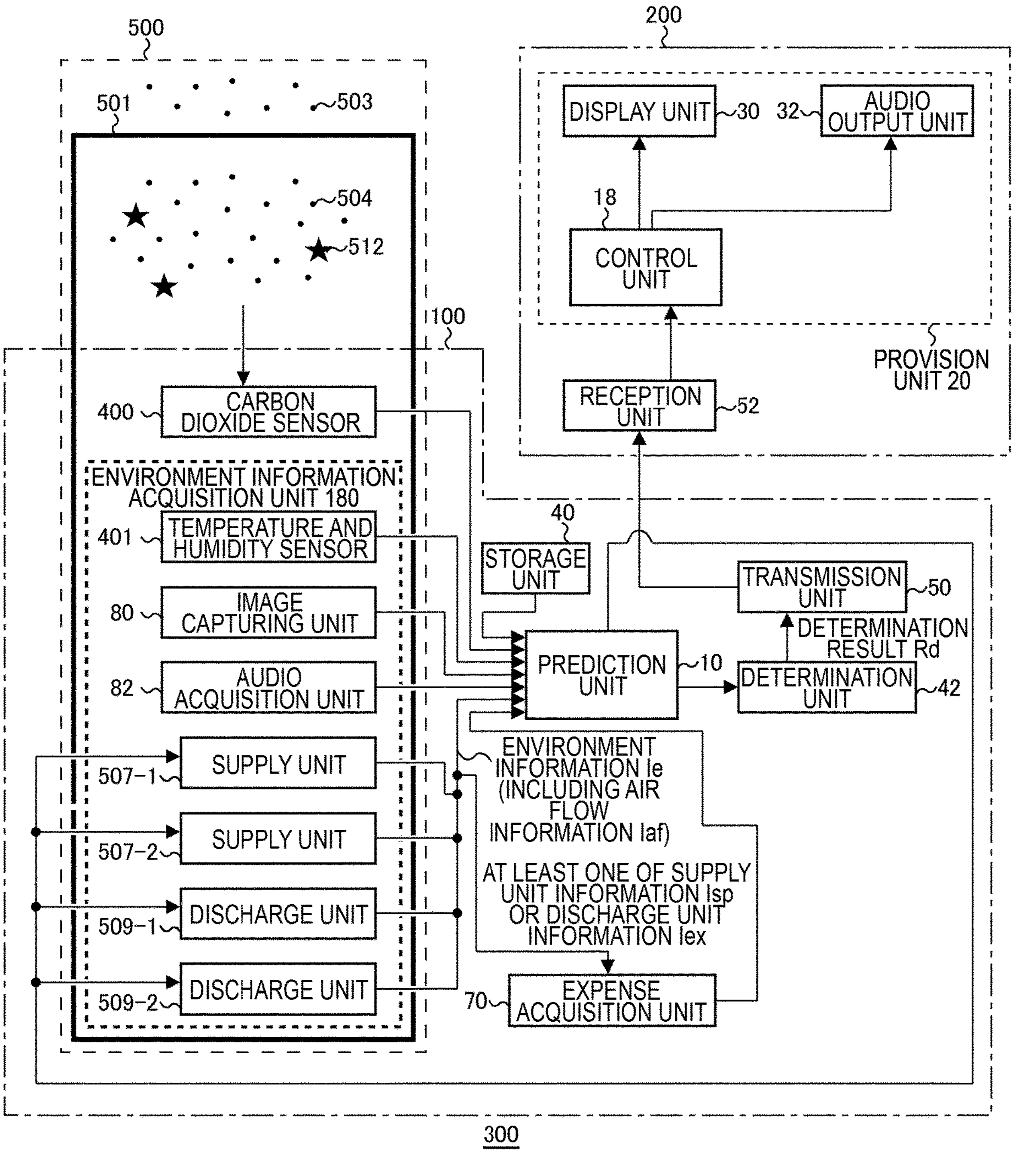
FIG. 24 is a block diagram illustrating another example of the carbon dioxide concentration prediction system 300 according to an embodiment of the present invention.

FIG. 24 is a block diagram illustrating another example of the carbon dioxide concentration prediction system 300 according to an embodiment of the present invention. In the present example, the carbon dioxide concentration prediction system 300 further includes a determination unit 42. The present example is different from the carbon dioxide concentration prediction system 300 illustrated in FIG. 20 in the above described aspect. In the present example, the carbon dioxide concentration prediction apparatus 100 includes the determination unit 42.

The determination unit 42 is configured to determine a magnitude relationship between the concentration Cf and the threshold concentration Cth. The concentration Cf is the $CO_2$ (carbon dioxide) concentration at the clock time tf (see FIG. 3 to FIG. 6) as described above. The determination unit 42 may determine a magnitude relationship between the first concentration Cf1 and the threshold concentration Cth, or may determine a magnitude relationship between the second concentration Cf2 and the threshold concentration Cth. As described above, the second concentration Cf2 is the $CO_2$ (carbon dioxide) concentration predicted by the prediction unit 10 and is the $CO_2$ (carbon dioxide) concentration in a case at least one of the supply unit 507 or the exhaust unit 509 has changed from the current operation state. Note that the threshold concentration Cth may be stored in the storage unit 40.

When it is determined by the determination unit 42 that the concentration Cf is higher than or equal to the threshold concentration Cth, the provision unit 20 may provide warning information related to the $CO_2$ (carbon dioxide) concentration of the internal space 508. In the present example, the provision unit 20 provides the warning information when it is determined by the determination unit 42 that the second concentration Cf2 is higher than or equal to the threshold concentration Cth. In this manner, the user of the carbon dioxide concentration prediction system 300 can previously recognize, at the clock time t2 (see FIG. 3 to FIG. 6), that the second concentration Cf2 may become higher than or equal to the threshold concentration Cth.

FIG. 7, FIG. 8, and FIG. 10 are examples of the provision of the warning information related to the $CO_2$ (carbon dioxide) concentration. In the examples illustrated in FIG. 9, FIG. 11, and FIG. 12, warning information related to the $CO_2$ (carbon dioxide) concentration may be displayed on the display unit 30. In the example illustrated in FIG. 11, warning information related to the $CO_2$ (carbon dioxide) concentration may be output from the audio output unit 32.

When the $CO_2$ (carbon dioxide) concentration of the internal space 508 is higher than or equal to the threshold concentration Cth, the supply unit 507 may supply the external gas 503 to the internal space 508 or the exhaust unit 509 may evacuate the internal gas 504 to the outside of the internal space 508. The supply unit 507 may start to supply the external gas 503 to the internal space 508 at the clock time t2 (see FIG. 3 to FIG. 6). The exhaust unit 509 may start to evacuate the internal gas 504 to the outside of the internal space 508 at the clock time t2. In this manner, the $CO_2$ (carbon dioxide) concentration (the concentration Cf) at the clock time tf (see FIG. 3 to FIG. 6) tends to be lower than the threshold concentration Cth.

Figure 25:
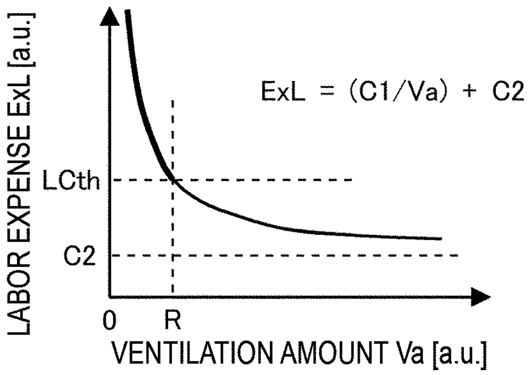
FIG. 25 is a conceptual diagram illustrating an example of a correlation between a labor expense and a ventilation amount.

FIG. 25 is a conceptual diagram illustrating an example of a relationship between a labor expense and a ventilation amount. The labor expense is set as a labor expense ExL. The ventilation amount is set as a ventilation amount Va. The labor expense ExL is an expense occurring in a case where an employer of an employee employs the employee for labor. In the present example, the labor expense ExL is an expense occurring in a case where an employer of the living subject 90 (see FIG. 1) employs the living subject 90 for labor in the internal space 508 (see FIG. 1). In the present example, the ventilation amount Va refers to at least one of a supply amount of the external gas 503 to the internal space 508 or an exhaust amount of the internal gas 504 to the outside of the internal space 508. Note that the labor expense ExL may be a personnel cost.

The relationship between the labor expense ExL and the ventilation amount Va is represented by the following expression 4.

(Expression. 4)

$$ExL = \frac{C1}{Va} + C2 \tag{4}$$

Where C1 and C2 are positive constants. As represented by Expression 4, as the ventilation amount Va decreases, the labor expense ExL tends to increase. As the ventilation amount Va increases, the labor expense ExL becomes asymptotically closer to the constant C2.

As the $CO_2$ (carbon dioxide) concentration of the internal space 508 (see FIG. 1) increases, the living subject 90 (see FIG. 1) is more likely to be infected with the infectious source 512. The infectious source 512 may be a cold virus or the like. Thus, as the $CO_2$ (carbon dioxide) concentration of the internal space 508 increases, labor productivity of the living subject 90 is more likely to fall. Thus, as the $CO_2$ ($CO_2$ carbon dioxide) concentration of the internal space 508 increases, the labor expense ExL of the living subject 90 is more likely to increase.

A predetermined threshold of the labor expense ExL is set as a threshold LCth. The threshold LCth may be an upper limit of the labor expense ExL acceptable for the employer. The threshold LCth may be set by the employer. In FIG. 25, a correlation higher than or equal to the threshold LCth is represented by a thick line. The ventilation amount Va corresponding to the threshold LCth is set as a ventilation amount R.

The storage unit 40 (see FIG. 20 or FIG. 24) may store a correlation between the $CO_2$ (carbon dioxide) concentration of the internal space 508 (see FIG. 1) and the labor expense ExL of the living subject 90 (see FIG. 1). The prediction unit 10 may predict the labor expense ExL of the living subject 90 corresponding to the $CO_2$ (carbon dioxide) concentration of the internal space 508 based on the correlation stored in the storage unit 40.

When the labor expense ExL of the living subject 90 which is predict by the prediction unit 10 is higher than or equal to the threshold LCth, the supply unit 507 may supply the external gas 503 to the internal space 508 or the exhaust unit 509 may evacuate the internal gas 504 to the outside of the internal space 508. The supply of the external gas 503 to the internal space 508 by the supply unit 507 or the evacuation of the internal gas 504 to the outside of the internal space 508 by the exhaust unit 509 may refer to setting the ventilation amount Va illustrated in FIG. 25 to be higher than the ventilation amount R. In this manner, the labor expense ExL of the living subject 90 tends to be lower than the threshold LCth.

Figure 26:
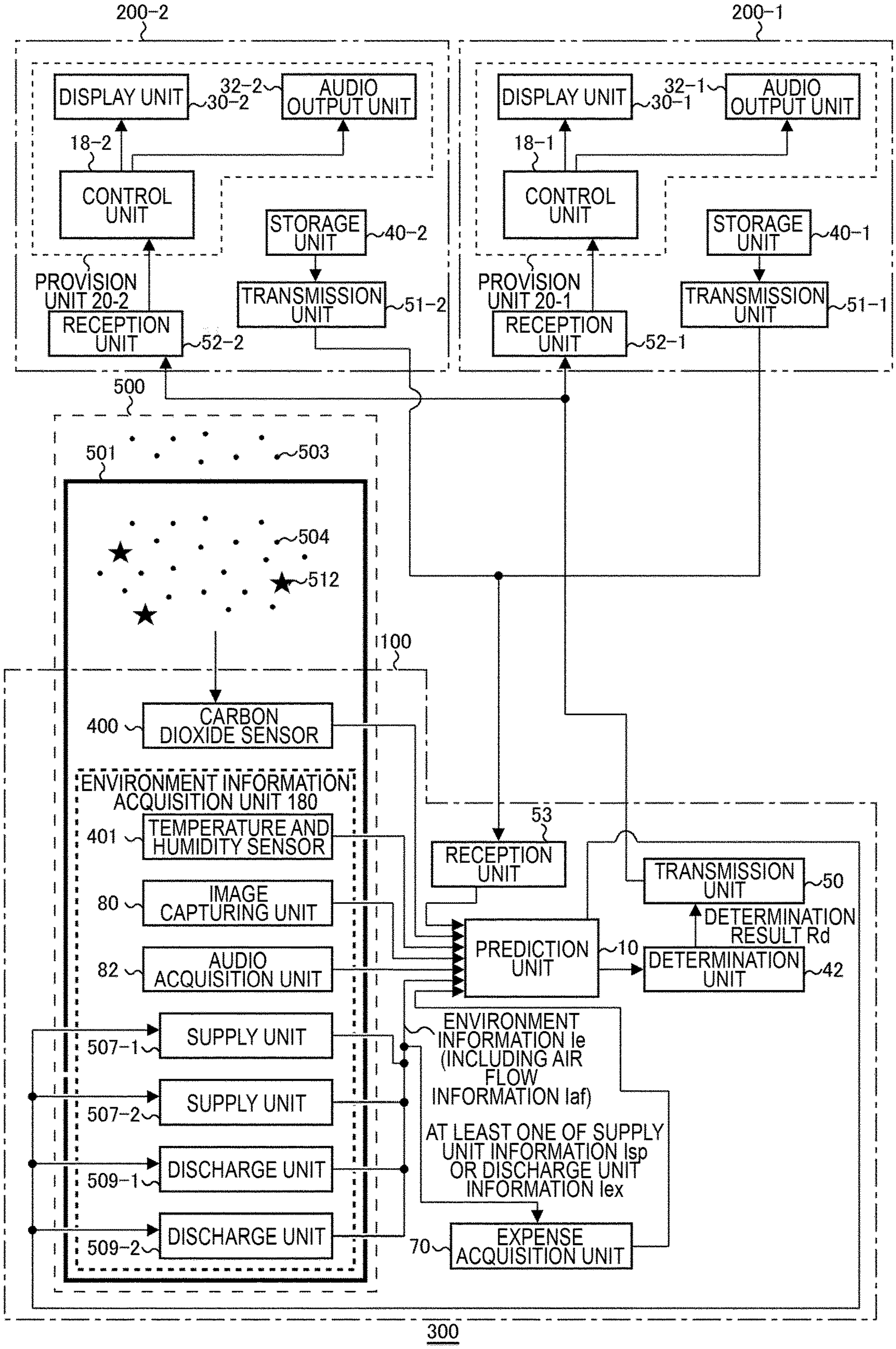
FIG. 26 is a block diagram illustrating another example of the carbon dioxide concentration prediction system 300 according to an embodiment of the present invention.

FIG. 26 is a block diagram illustrating another example of the carbon dioxide concentration prediction system 300 according to an embodiment of the present invention. The carbon dioxide concentration prediction system 300 may include a plurality of terminals 200. In the present example, the carbon dioxide concentration prediction system 300 includes two terminals 200 (a terminal 200-1 and a terminal 200-2). In the present example, the terminal 200 has the storage unit 40. In the present example, the terminal 200 further has a transmission unit 51. In the present example, the carbon dioxide concentration prediction apparatus 100 further has a reception unit 53. The present example is different from the carbon dioxide concentration prediction system 300 illustrated in FIG. 24 in these aspects.

Each of the plurality of terminals 200 may have the provision unit 20 and the storage unit 40. In the present example, the terminal 200-1 has a provision unit 20-1 and a storage unit 40-1, and the terminal 200-2 has a provision unit 20-2 and a storage unit 40-2. In the present example, the provision unit 20-1 has a control unit 18-1, a display unit 30-1, and an audio output unit 32-1. In the present example, the provision unit 20-2 has a control unit 18-2, a display unit 30-2, and an audio output unit 32-2.

Each of the storage units 40 may store the threshold concentration Cth. In the present example, the threshold concentration Cth stored in the storage unit 40-1 is set as a threshold concentration Cth1, and the threshold concentration Cth stored in the storage unit 40-2 is set as a threshold concentration Cth2. The threshold concentration Cth1 and the threshold concentration Cth2 may be different from each other. In the present example, the threshold concentration Cth is previously set for each of the terminals 200.

Each of the plurality of terminals 200 may have the transmission unit 51. In the present example, the terminal 200-1 has a transmission unit 51-1, and the terminal 200-2 has a transmission unit 51-2. The transmission unit 51 may transmit the threshold concentration Cth stored in the storage unit 40. In the present example, the transmission unit 51-1 is configured to transmit the threshold concentration Cth1, and the transmission unit 51-2 is configured to transmit the threshold concentration Cth2.

The reception unit 53 is configured to receive the threshold concentration Cth transmitted by the transmission unit 51 of each of the plurality of terminals 200. In the present example, the reception unit 53 receives the threshold concentration Cth1 and the threshold concentration Cth2.

The determination unit 42 is configured to determine a magnitude relationship between the second concentration Cf2 predicted by the prediction unit 10 and each of the threshold concentrations Cth stored in each of the storage units 40 in the plurality of terminals 200. As described above, the second concentration Cf2 is the $CO_2$ (carbon dioxide) concentration predicted by the prediction unit 10 and is the $CO_2$ (carbon dioxide) concentration in a case where at least one of the supply unit 507 or the exhaust unit 509 has changed from the current operation state. In the present example, the determination unit 42 compares the second concentration Cf2 predicted by the prediction unit 10 with the threshold concentration Cth1. In the present example, the determination unit 42 compares the second concentration Cf2 with the threshold concentration Cth2.

When it is determined by the determination unit 42 that the second concentration Cf2 is higher than the threshold concentration Cth stored in the storage unit 40 in one terminal 200, the provision unit 20 in the one terminal 200 may provide warning information related to the $CO_2$ (carbon dioxide) concentration of the internal space 508. In a case where the one terminal 200 is the terminal 200-1, when it is determined by the determination unit 42 that the second concentration Cf2 is higher than the threshold concentration Cth1 stored in the storage unit 40-1, the provision unit 20-1 provides warning information.

The threshold concentration Cth for each of the plurality of terminals 200 may be set by the user of each of the plurality of terminals 200. In this manner, the user of the terminal 200 can provide warning information when the second concentration Cf2 is higher than the desired threshold concentration Cth.

Figure 27:
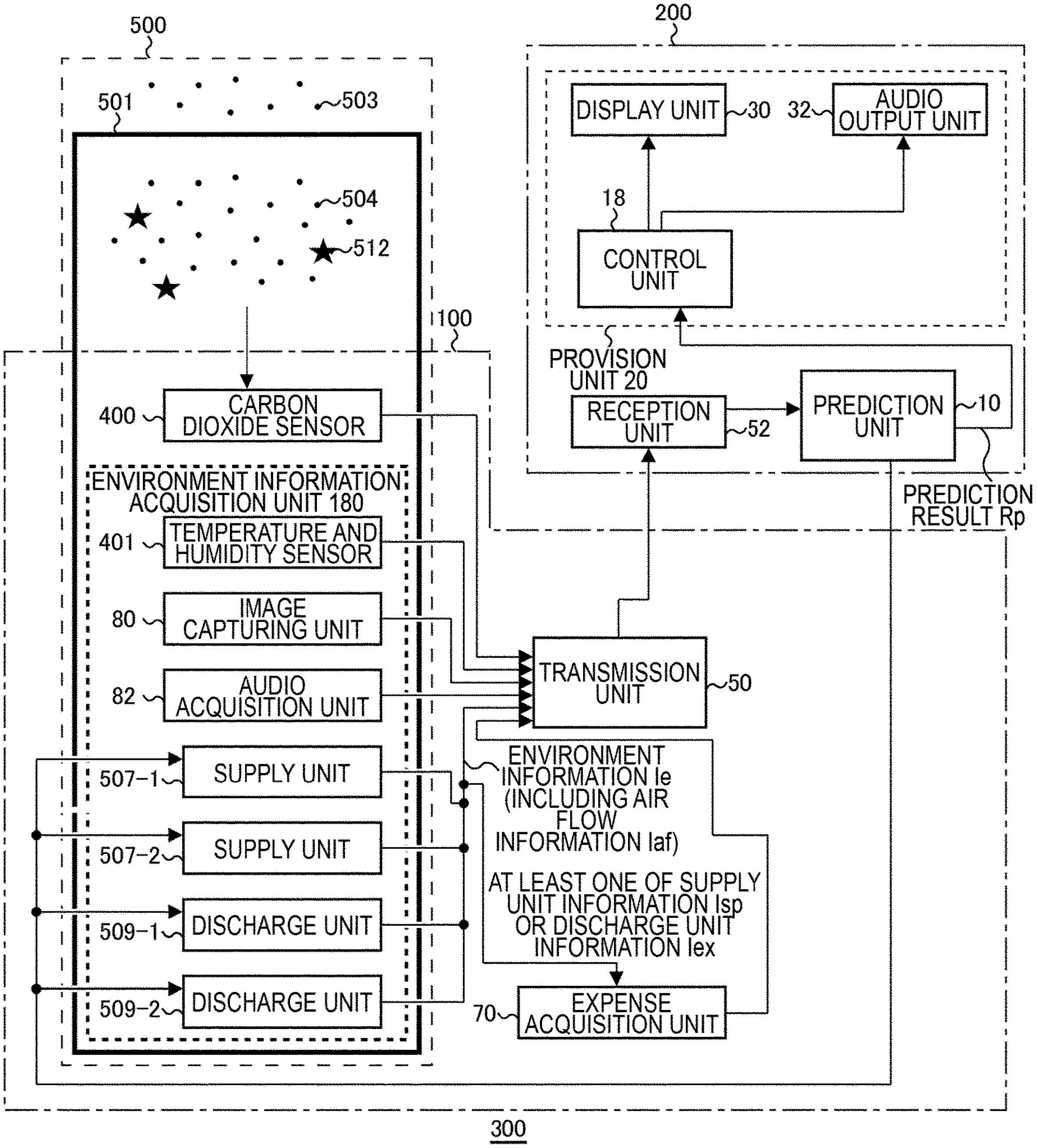
FIG. 27 is a block diagram illustrating another example of the carbon dioxide concentration prediction system 300 according to an embodiment of the present invention.

FIG. 27 is a block diagram illustrating another example of the carbon dioxide concentration prediction system 300 according to an embodiment of the present invention. In the present example, the carbon dioxide concentration prediction apparatus 100 does not include the prediction unit 10, and the terminal 200 includes the prediction unit 10. The present example is different from the example illustrated in FIG. 19 in the above described aspect.

The transmission unit 50 may transmit, to the terminal 200, at least one of the $CO_2$ (carbon dioxide) concentration measured by the $CO_2$ (carbon dioxide) sensor 400, the environment information Ie acquired by the environment information acquisition unit 180, or the expense Ex acquired by the expense acquisition unit 70.

Figure 28:
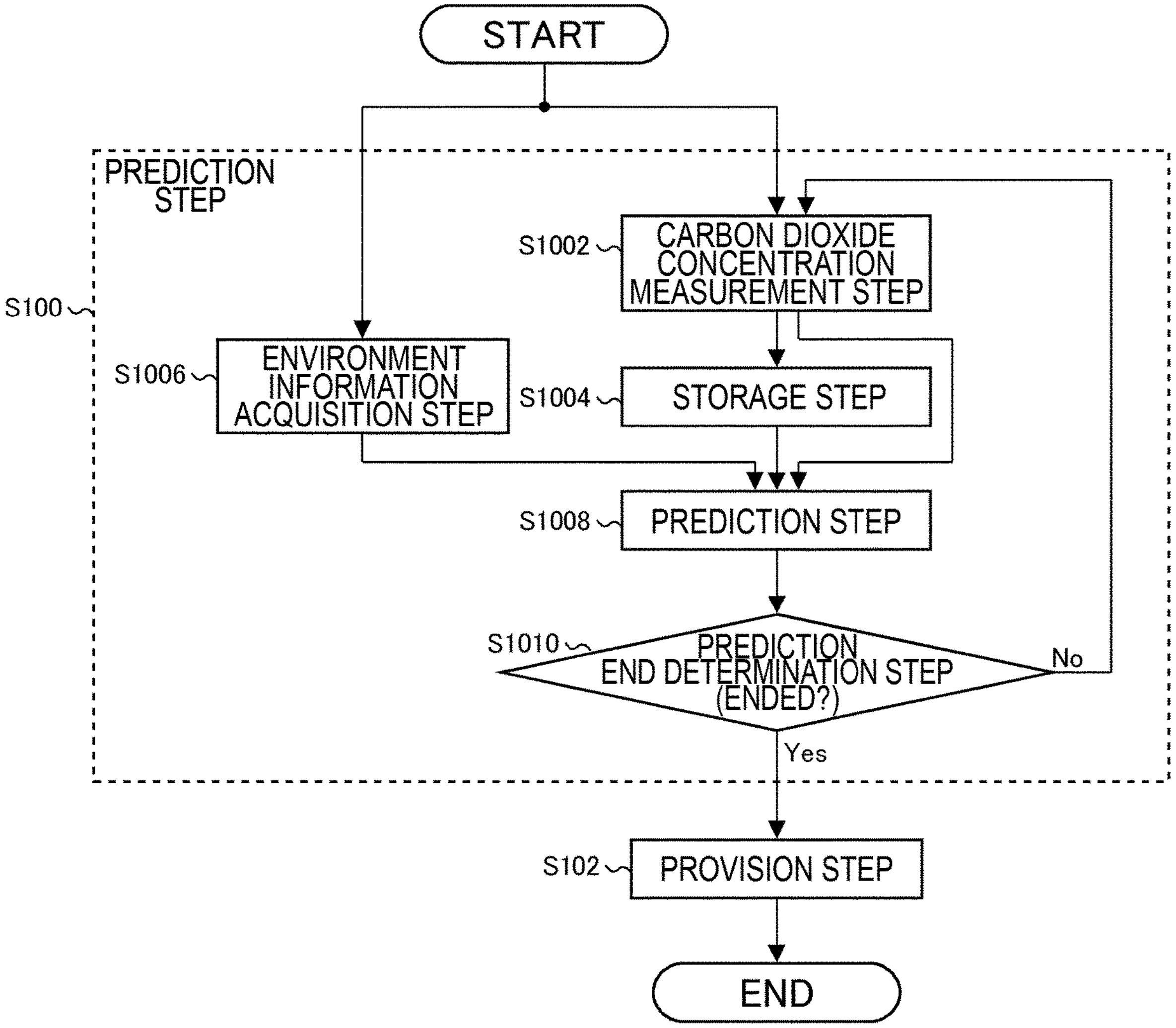
FIG. 28 is a flowchart illustrating an example of a carbon dioxide concentration prediction method according to an embodiment of the present invention.

FIG. 28 is a flowchart illustrating an example of a carbon dioxide concentration prediction method according to an embodiment of the present invention. The carbon dioxide concentration prediction method includes a prediction step S100 and a provision step S102. The carbon dioxide concentration prediction method according to an embodiment of the present invention will be described by using the carbon dioxide concentration prediction system 300 illustrated in FIG. 20 as an example.

The prediction step S100 is a step for the prediction unit 10 to predict the $CO_2$ (carbon dioxide) concentration of the internal space 508 based on the current $CO_2$ (carbon dioxide) concentration of the internal space 508 (see FIG. 1) in the prediction target 500 and the environment information Ie in the prediction target 500. The current $CO_2$ (carbon dioxide) concentration may refer to the $CO_2$ (carbon dioxide) concentration (the concentration Cp) during the time T1 in FIG. 3. The environment information Ie may be information related to the living subject 90 (see FIG. 1) and information that may affect a risk degree of being infected with the infectious source 512 in the prediction target 500. The environment information Ie may include information of the exhaust amount $E_{co2}$ (see FIG. 1).

The prediction step S100 may have a $CO_2$ (carbon dioxide) concentration measurement step S1002, a storage step S1004, an environment information acquisition step S1006, a prediction step S1008, and a prediction end determination step S1010. The $CO_2$ (carbon dioxide) concentration measurement step S1002 is a step for the $CO_2$ (carbon dioxide) sensor 400 to measure the $CO_2$ (carbon dioxide) concentration in the internal space 508. The storage step S1004 is a step for the storage unit 40 to store the $CO_2$ (carbon dioxide) concentration measured in the $CO_2$ (carbon dioxide) concentration measurement step S1002. The environment information acquisition step S1006 is a step for the environment information acquisition unit 180 to acquire the environment information Ie in the prediction target 500.

The prediction step S1008 is a step for the prediction unit 10 to predict the $CO_2$ (carbon dioxide) concentration of the internal space 508 based on the $CO_2$ (carbon dioxide) concentration measured in the $CO_2$ (carbon dioxide) concentration measurement step S1002 and the environment information Ie acquired in the environment information acquisition step S1006. The prediction step S1008 may be a step for the prediction unit 10 to predict the $CO_2$ (carbon dioxide) concentration of the internal space 508 based on the $CO_2$ (carbon dioxide) concentration stored in the storage step S1004 and the environment information Ie acquired in the environment information acquisition step S1006. The $CO_2$ (carbon dioxide) concentration predicted in the prediction step S1008 may be the $CO_2$ (carbon dioxide) concentration predicted based on a plurality of $CO_2$ (carbon dioxide) concentrations which are measured at a plurality of clock times during a time from the clock time t1 illustrated in FIG. 3 to FIG. 6 up to the clock time t2. The clock time t2 may be sequentially updated. Update of the $CO_2$ (carbon dioxide) concentration predicted in the prediction step S1008 may continue according to the update of the clock time t2.

The update of the clock time t2 may continue up to a predetermined clock time after the clock time t1. The predetermined clock time is set as the clock time t2*e*. When the clock time t2 has reached the clock time t2*e*, the update of the clock time t2 may end.

The prediction step S1008 may be a step for the prediction unit 10 to predict at least one of the first concentration Cf1, the second concentration Cf2, or the expense Ex in a case where the $CO_2$ (carbon dioxide) concentration is the second concentration Cf2. As described above, the first concentration Cf1 is the $CO_2$ (carbon dioxide) concentration in the current operation state of the supply unit 507 and the exhaust unit 509, and the second concentration Cf2 is the $CO_2$ (carbon dioxide) concentration in a case where at least one of the supply unit 507 or the exhaust unit 509 has changed from the current operation state.

The prediction end determination step S1010 is a step for the prediction unit 10 to determine whether the prediction of the $CO_2$ (carbon dioxide) concentration of the internal space 508 is ended. The determination on whether the prediction of the $CO_2$ (carbon dioxide) concentration is ended by the prediction unit 10 may be a step for the prediction unit 10 to determine whether the clock time t2*e* has been reached. When it is determined that the prediction of the $CO_2$ (carbon dioxide) concentration is not ended by the prediction unit 10 (the clock time t2*e* has not been reached), the carbon dioxide concentration prediction method returns to the $CO_2$ (carbon dioxide) concentration measurement step S1002. When it is determined that the prediction of the $CO_2$ (carbon dioxide) concentration is ended by the prediction unit 10 (the clock time t2*e* has been reached), the carbon dioxide concentration prediction method proceeds to the provision step S102.

When the carbon dioxide concentration prediction method does not proceed to the provision step S102 (when the carbon dioxide concentration prediction method is in the prediction step S100), an effect may be displayed on the display unit 30 that the prediction of the $CO_2$ (carbon dioxide) concentration is currently being calculated. For example, "$CO_2$ concentration currently being predicted", "currently being predicted again", or the like may be displayed on the display unit 30.

The provision step S102 is a step for the provision unit 20 to provide the $CO_2$ (carbon dioxide) concentration predicted in the prediction step S100. The provision step S102 may be a step for the provision unit 20 to provide the current $CO_2$ (carbon dioxide) concentration in the prediction target 500 and the $CO_2$ (carbon dioxide) concentration predicted in the prediction step S100. The $CO_2$ (carbon dioxide) concentration predicted in the prediction step S100 may be the $CO_2$ (carbon dioxide) concentration (the concentration Cf) at the clock time tf illustrated in FIG. 3 to FIG. 6.

The provision step S102 may be a step for the control unit 18 to cause the display unit 30 to display the concentration Cp and the concentration Cf. The provision step S102 may be a step for the control unit 18 to cause the audio output unit 32 to output the concentration Cp and the concentration Cf. The provision step S102 may be a step for the provision unit 20 to provide at least one of the current $CO_2$ (carbon dioxide) concentration in the prediction target 500, the first concentration Cf1, the second concentration Cf2, or the expense Ex in a case where the $CO_2$ (carbon dioxide) concentration is the second concentration Cf2.

Figure 29:
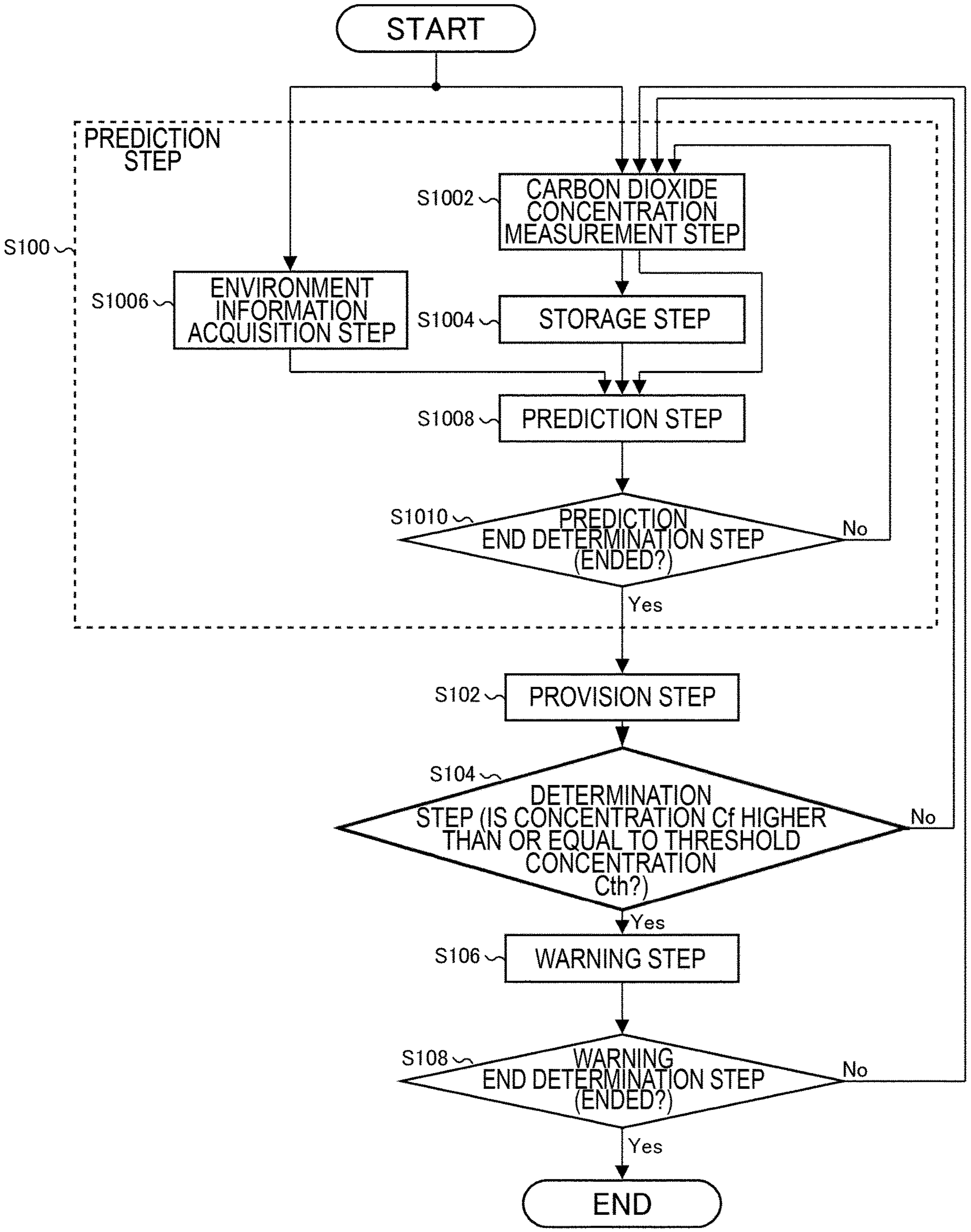
FIG. 29 is a flowchart illustrating another example of the carbon dioxide concentration prediction method according to an embodiment of the present invention.

FIG. 29 is a flowchart illustrating another example of the carbon dioxide concentration prediction method according to an embodiment of the present invention. In the present example, the carbon dioxide concentration prediction method further includes a determination step S104, a warning step S106, and a warning end determination step S108. The carbon dioxide concentration prediction method of the present example is different from the carbon dioxide concentration prediction method illustrated in FIG. 28 in the above described aspect.

The determination step S104 is a step for the determination unit 42 to determine a magnitude relationship between the $CO_2$ (carbon dioxide) concentration (the concentration Cf) predicted in the prediction step S100 and the threshold concentration Cth that is a threshold of the $CO_2$ (carbon dioxide) concentration of the internal space 508. When it is determined in the determination step S104 that the concentration Cf is higher than or equal to the threshold concentration Cth, the carbon dioxide concentration prediction method proceeds to the warning step S106. When it is determined by the determination unit 42 that the concentration Cf is lower than the threshold concentration Cth, the carbon dioxide concentration prediction method may return to the $CO_2$ (carbon dioxide) concentration measurement step S1002.

The warning step S106 is a step for the provision unit 20 to provide a warning related to the $CO_2$ (carbon dioxide) concentration of the internal space 508. The warning step S106 may be a step for the control unit 18 to cause the display unit 30 to display the concentration Cf and also cause the terminal 200 to vibrate. The warning step S106 may be a step for the control unit 18 to cause the audio output unit 32 to output the concentration Cf.

The warning end determination step S108 is a step for the determination unit 42 to determine whether the warning in the warning step S106 is ended. When it is determined that the warning in the warning end determination step S108 is not ended, the carbon dioxide concentration prediction method may return to the $CO_2$ (carbon dioxide) concentration measurement step S1002. When it is determined that the warning in the warning end determination step S108 is ended, the carbon dioxide concentration prediction method ends the prediction.

When the carbon dioxide concentration prediction method returns to the $CO_2$ (carbon dioxide) concentration measurement step S1002, the provision of the warning provided in the warning step S106 may continue even when the carbon dioxide concentration prediction method is in any step of the prediction step S100, the provision step S102, and the determination step S104. A case where it is determined in the warning end determination step S108 that the warning is ended may be a case where the warning is provided for a predetermined time in the warning step S106, or a case where a power source of the carbon dioxide concentration prediction system 300 is turned off.

Various embodiments of the present invention may be described with reference to flowcharts and block diagrams. In various embodiments of the present invention, blocks may represent (1) steps of processes in which operations are executed or (2) sections of apparatuses responsible for executing operations.

Particular steps may be performed by a dedicated circuit, a programmable circuit, or a processor. Particular sections may be implemented by a dedicated circuit, a programmable circuit, or a processor. The programmable circuit and the processor may be supplied together with computer readable instructions. The computer readable instructions may be stored on a computer readable medium.

The dedicated circuit may include at least one of a digital hardware circuit or an analog hardware circuit. The dedicated circuit may include at least one of an integrated circuit (IC) or a discrete circuit. The programmable circuit may include a hardware circuit of logical AND, logical OR, logical XOR, logical NAND, logical NOR, or other logical operations. The programmable circuit may include a reconfigurable hardware circuit including a memory element such as a flip-flop, a register, a field programmable gate array (FPGA), or a programmable logic array (PLA), or the like.

A computer readable medium may include any tangible device that can store instructions to be executed by a suitable device. Since the computer readable medium include the tangible device, the computer readable medium having instructions stored in the device includes an article of manufacture including instructions which can be executed in order to create means for performing operations specified in the flowcharts or block diagrams.

The computer readable medium may be, for example, an electronic storage medium, a magnetic storage medium, an optical storage medium, an electromagnetic storage medium, a semiconductor storage medium, or the like. More specifically, the computer readable medium may be, for example, a floppy disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disc read only memory (CD-ROM), a digital versatile disk (DVD), a BLU-RAY (registered trademark) disk, a memory stick, an integrated circuit card, or the like.

The computer readable instructions may include assembler instructions, instruction-set-architecture (ISA) instructions, machine instructions, machine dependent instructions, microcode, firmware instructions, state-setting data, or either source code or object code. The source code and the object code may be written in any combination of one or more programming languages, including an object oriented programming language and conventional procedural programming languages. The object oriented programming language may be, for example, Smalltalk (registered trademark), JAVA (registered trademark), C++, or the like. The procedural programming language may be, for example, the "C" programming language.

The computer readable instructions may be provided to a processor of a general purpose computer, special purpose computer, or other programmable data processing apparatus, or to a programmable circuit, locally or via a local area network (LAN) or a wide area network (WAN) such as the Internet. The processor of the general purpose computer, the special purpose computer, or the other programmable data processing apparatus, or the programmable circuit may perform the computer readable instructions in order to create means for performing operations specified in the flowchart illustrated in FIG. 28 or FIG. 29 or the block diagram illustrated in FIG. 2, FIG. 13, FIG. 15, FIG. 16, FIG. 19, FIG. 20, FIG. 24, FIG. 26, or FIG. 27. The processor may be, for example, a computer processor, a processing unit, a microprocessor, a digital signal processor, a controller, a microcontroller, or the like.

Figure 30:
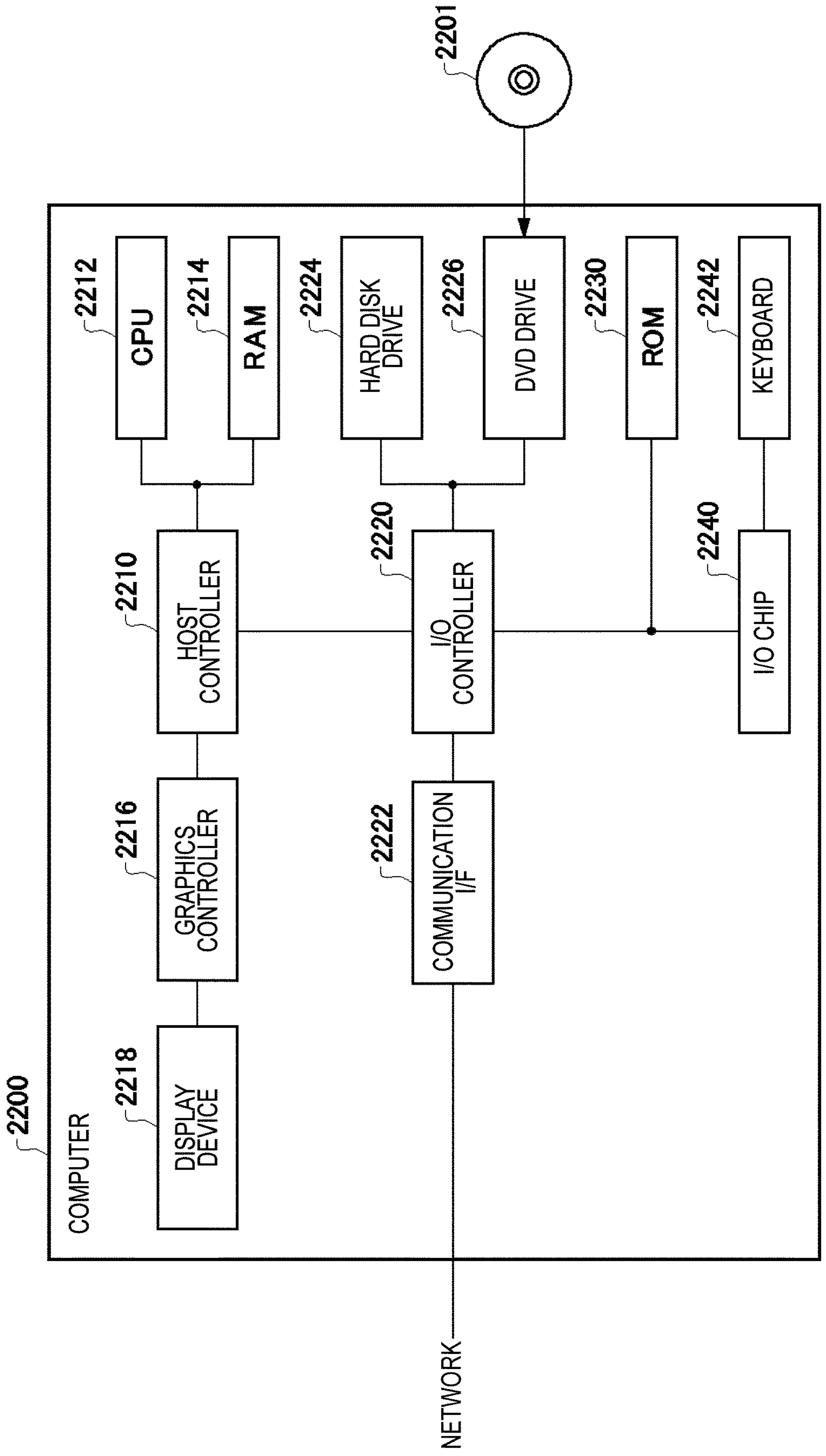
FIG. 30 illustrates an example of a computer 2200 in which a carbon dioxide concentration prediction apparatus 100 or the carbon dioxide concentration prediction system 300 according to an embodiment of the present invention may be entirely or partially implemented.

FIG. 30 illustrates an example of a computer 2200 in which the carbon dioxide concentration prediction apparatus 100 or the carbon dioxide concentration prediction system 300 according to an embodiment of the present invention may be entirely or partially implemented. A program that is installed in the computer 2200 can cause the computer 2200 to function as manipulations associated with the carbon dioxide concentration prediction apparatus 100 or the carbon dioxide concentration prediction system 300 according to the embodiments of the present invention or one or more sections of the carbon dioxide concentration prediction apparatus 100 or the carbon dioxide concentration prediction system 300 or perform the manipulations or the one or more sections, or can cause the computer 2200 to perform steps (see FIG. 28 or FIG. 29) according to the carbon dioxide concentration prediction method of the present invention. The program may be executed by the CPU 2212 to cause the computer 2200 to perform certain manipulations associated with some or all of the flowcharts (FIG. 28 or FIG. 29) and the block diagrams (FIG. 2, FIG. 13, FIG. 15, FIG. 16, FIG. 19, FIG. 20, FIG. 24, FIG. 26, or FIG. 27) described in the present specification.

The computer 2200 according to an embodiment of the present invention includes a CPU 2212, a RAM 2214, a graphics controller 2216, and a display device 2218. The CPU 2212, the RAM 2214, the graphics controller 2216, and the display device 2218 may be connected to each other by a host controller 2210. The computer 2200 further includes an input and output unit such as a communication interface 2222, a hard disk drive 2224, a DVD-ROM drive 2226, and an IC card drive. The communication interface 2222, the hard disk drive 2224, the DVD-ROM drive 2226, the IC card drive, and the like are connected to the host controller 2210 via an input and output controller 2220. The computer further includes legacy input and output units such as a ROM 2230 and a keyboard 2242. The ROM 2230, the keyboard 2242, and the like are connected to the input and output controller 2220 via an input and output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the RAM 2214, so that the image data is caused to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the read programs or data via the RAM 2214. The IC card drive reads programs and data from an IC card, or writes programs and data into the IC card.

The ROM 2230 stores a boot program or the like executed by the computer 2200 at the time of activation or a program depending on the hardware of the computer 2200. The input and output chip 2240 may connect various input and output units via a parallel port, a serial port, a keyboard port, a mouse port, or the like to the input and output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above described various types of hardware resources. An apparatus or method may be constituted by realizing the manipulation or processing of information in accordance with the usage of the computer 2200.

For example, when communication is executed between the computer 2200 and an external device, the CPU 2212 may execute a communication program loaded onto the RAM 2214, and instruct the communication interface 2222 to process the communication based on the processing written in the communication program. Under control of the CPU 2212, the communication interface 2222 reads transmission data stored in a transmission buffering region provided in a recording medium such as the RAM 2214, the hard disk drive 2224, the DVD-ROM 2201, or the IC card, and transmits the read transmission data to the network, or writes reception data received from the network to a reception buffering region or the like provided on the recording medium.

The CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), or the IC card. The CPU 2212 may perform various types of processes on data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of manipulations, processing of information, condition judging, conditional branch, unconditional branch, search/replace of information, etc., as described throughout this disclosure and designated by an instruction sequence of programs. The CPU 2212 may write the result back to the RAM 2214.

The CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry to read the second attribute value, thereby obtaining the attribute value of the second attribute associated with the first attribute satisfying the predetermined condition.

The program or software modules described above may be stored on the computer 2200 or in the computer readable media of the computer 2200. A recording medium such as a hard disk or a RAM provided in a server system connected to a dedicated communication network or the Internet can be used as the computer readable media. The program may be provided to the computer 2200 by the recording medium.

While the embodiments of the present invention have been described above, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 prediction unit, 18 control unit, 20 provision unit, 30 display unit, 32 audio output unit, 40 storage unit, 42 determination unit, 50 transmission unit, 51 transmission unit, 52 reception unit, 53 reception unit, 70 expense acquisition unit, 80 image capturing unit, 82 audio acquisition unit, 90 living subject, 100 carbon dioxide concentration prediction apparatus, 180 environment information acquisition unit, 200 terminal, 300 carbon dioxide concentration prediction system, 400 sensor, 401 temperature and humidity sensor, 500 prediction target, 501 room, 502 external space, 503 external gas, 504 internal gas, 507 supply unit, 508 internal space, 509 exhaust unit, 512 infectious source, 2200 computer, 2201 DVD-ROM, 2210 host controller,

2212 CPU, 2214 RAM, 2216 graphics controller, 2218 display device, 2220 input and output controller, 2222 communication interface, 2224 hard disk drive, 2226 DVD-ROM drive, 2230 ROM, 2240 input and output chip, 2242 keyboard

What is claimed is:

1. A carbon dioxide concentration prediction system comprising:

a prediction unit configured to predict, based on a current carbon dioxide concentration of an internal space in a prediction target and environment information in the prediction target, a carbon dioxide concentration of the internal space; and a provision unit configured to provide the carbon dioxide concentration predicted by the prediction unit, wherein the internal space contains a gas including carbon dioxide, the environment information further includes air flow information in the internal space, the air flow information includes at least one of information of a supply unit configured to supply an external gas outside the internal space to the internal space or information of an exhaust unit configured to evacuate an internal gas that is the gas in the internal space to outside of the internal space, the information of the supply unit, the information of the exhaust unit, and information of an air cleaner not involved in the supply of the external gas to the internal space include an expense from an operation of the supply unit, the exhaust unit, and the air cleaner, the prediction unit is configured to predict at least one of a first concentration that is the carbon dioxide concentration in a current operation state of the supply unit and the exhaust unit, a second concentration that is the carbon dioxide concentration in a case where at least one of the supply unit or the exhaust unit has changed from the current operation state, or the expense in a case where the carbon dioxide concentration is the second concentration, and the provision unit is configured to provide at least one of the current carbon dioxide concentration, the first concentration, the second concentration, or the expense;

wherein the prediction unit is configured to control at least one of the supply unit or the exhaust unit such that based on the predicted second concentration, the carbon dioxide concentration of the internal space is set to be lower than or equal to a threshold concentration that is determined according to the risk of infection in a region and/or during each period, the threshold concentration is changed, by online control, in accordance with a change of the risk of infection for each region and for each period, the prediction unit is configured to predict the second concentration for each of operation states of at least one of the supply unit or the exhaust unit, and the provision unit is configured to provide the second concentration and the expense for each of the operation states, and provide information related to operation state in which the second concentration is lower than or equal to the threshold concentration.

2. The carbon dioxide concentration prediction system according to claim 1, wherein the prediction unit is configured to further predict a change over time of the carbon dioxide concentration in the prediction target from the current carbon dioxide concentration to the carbon dioxide concentration predicted based on the current carbon dioxide concentration and the environment information, and the provision unit is configured to further provide the change over time of the carbon dioxide concentration.

3. The carbon dioxide concentration prediction system according to claim 1, wherein the first concentration is the carbon dioxide concentration in a state in which the supply unit and the exhaust unit are not operated, and the second concentration is the carbon dioxide concentration in a state in which at least one of the supply unit or the exhaust unit is operated.

4. The carbon dioxide concentration prediction system according to claim 1, wherein the prediction unit is configured to predict the carbon dioxide concentration of the internal space and the expense for each of operation states of at least one of the supply unit or the exhaust unit, and the provision unit is configured to provide the carbon dioxide concentration of the internal space and the expense which are predicted by the prediction unit for each of the operation states.

5. The carbon dioxide concentration prediction system according to claim 1, wherein the prediction unit is configured to further predict, based on the current carbon dioxide concentration and the first concentration, operation start timing of at least one of the supply unit or the exhaust unit, and further predict a third concentration that is the carbon dioxide concentration in a case where an operation of at least one of the supply unit or the exhaust unit is started at the operation start timing, and the provision unit is configured to further provide at least one of the operation start timing or the third concentration.

6. The carbon dioxide concentration prediction system according to claim 1, wherein the prediction unit is configured to further predict a size of the internal space based on an image of the internal space which is captured by an image capturing unit, and further predict the carbon dioxide concentration of the internal space further based on the predicted size of the internal space.

7. The carbon dioxide concentration prediction system according to claim 1, wherein the environment information includes motion information of the living subject existing in the internal space, and the prediction unit is configured to further predict the carbon dioxide concentration of the internal space further based on the motion information of the living subject.

8. The carbon dioxide concentration prediction system according to claim 7, wherein the prediction unit is configured to acquire the motion information of the living subject based on at least one of an image of the internal space which is captured by an image capturing unit or a sound of the living subject which is acquired by an audio acquisition unit.

9. The carbon dioxide concentration prediction system according to claim 1, wherein the prediction unit is configured to compensate an amount of carbon dioxide exhausted from the living subject based on the number information of the living subject and motion information of the living subject, and predict the carbon dioxide concentration of the internal space based on the compensated amount of carbon dioxide.

10. The carbon dioxide concentration prediction system according to claim 1, further comprising:

a plurality of terminals; and a determination unit configured to determine a magnitude relationship between the carbon dioxide concentration predicted by the prediction unit and a threshold concentration that is a threshold of the carbon dioxide concentration of the internal space, wherein each of the plurality of terminals has a storage unit and the provision unit, the storage unit is configured to store the threshold concentration, the prediction unit is configured to predict the second concentration, the determination unit is configured to determine a magnitude relationship between the second concentration predicted by the prediction unit and each of the threshold concentrations stored in each of the storage units, when the determination unit determines that the second concentration is higher than the threshold concentration stored in the storage unit in one terminal among the plurality of terminals, the provision unit in the one terminal is configured to provide warning information related to the carbon dioxide concentration of the internal space.

11. The carbon dioxide concentration prediction system according to claim 10, wherein the storage unit is configured to store a correlation between the carbon dioxide concentration of the internal space and a labor expense of the living subject existing in the internal space, the prediction unit is configured to predict the labor expense of the living subject corresponding to the carbon dioxide concentration of the internal space based on the correlation stored in the storage unit, and when the labor expense of the living subject which is predicted by the prediction unit is higher than or equal to a predetermined labor expense threshold, the supply unit is configured to supply the external gas to the internal space or the exhaust unit is configured to evacuate the internal gas to outside of the internal space.

12. The carbon dioxide concentration prediction system according to claim 1, wherein the prediction unit is configured to further predict, based on the current carbon dioxide concentration and the predicted carbon dioxide concentration of the internal space, operation start timing of at least one of the supply unit or the exhaust unit, and further predict a fourth concentration that is the carbon dioxide concentration in a case where an operation of at least one of the supply unit or the exhaust unit is started at the operation start timing, and the provision unit is configured to further provide at least one of the operation start timing or the fourth concentration.

13. The carbon dioxide concentration prediction system according to claim 1, wherein the provision unit provides information for recommending cleaning of a filter, when an exhaust amount becomes lower or equal to a predetermined exhaust amount.

14. The carbon dioxide concentration prediction system according to claim 1, wherein the prediction unit predicts a humidity of the internal space based on a current humidity of the internal space.

15. The carbon dioxide concentration prediction system according to claim 1, wherein the environment information includes one or more of a sound of a voice, a sound of a cough, or a sound of a sneeze.

16. A carbon dioxide concentration prediction method comprising:

predicting, by a prediction unit, based on a current carbon dioxide concentration of an internal space in a prediction target and environment information in the prediction target, a carbon dioxide concentration of the internal space; and providing, by a provision unit, the carbon dioxide concentration predicted in the predicting, wherein the internal space contains a gas including carbon dioxide, the environment information further includes air flow information in the internal space, the air flow information includes at least one of information of a supply unit configured to supply an external gas outside the internal space to the internal space or information of an exhaust unit configured to evacuate an internal gas that is the gas in the internal space to outside of the internal space, the information of the supply unit, the information of the exhaust unit, and information of an air cleaner not involved in the supply of the external gas to the internal space include an expense from an operation of the supply unit, the exhaust unit, and the air cleaner, the predicting includes predicting, by the prediction unit, at least one of a first concentration that is the carbon dioxide concentration in a current operation state of the supply unit and the exhaust unit, a second concentration that is the carbon dioxide concentration in a case where at least one of the supply unit or the exhaust unit has changed from the current operation state, or the expense in a case where the carbon dioxide concentration is the second concentration, and the providing includes providing, by the provision unit, at least one of the current carbon dioxide concentration, the first concentration, the second concentration, or the expense;

wherein the predicting, by the prediction unit, includes controlling at least one of the supply unit or the exhaust unit such that based on the predicted second concentration, the carbon dioxide concentration of the internal space is set to be lower than or equal to a threshold concentration that is determined according to the risk of infection in a region and/or during each period, the threshold concentration is changed, by online control, in accordance with a change of the risk of infection for each region and for each period, the predicting, by the prediction unit, includes predicting the second concentration for each of operation states of at least one of the supply unit or the exhaust unit, and the providing includes providing, by the provision unit, the second concentration and the expense for each of the operation states, and provide information related to operation state in which the second concentration is lower than or equal to the threshold concentration.

17. A non-transitory computer readable medium having recorded thereon a program that, when executed by a computer, causes the computer to perform operations comprising:

predicting, based on a current carbon dioxide concentration of an internal space in a prediction target and environment information in the prediction target, a carbon dioxide concentration of the internal space, wherein the internal space contains a gas including carbon dioxide, the environment information further includes air flow information in the internal space, the air flow information includes at least one of information of a supply unit configured to supply an external gas outside the internal space to the internal space or information of an exhaust unit configured to evacuate an internal gas that is the gas in the internal space to outside of the internal space, the information of the supply unit, the information of the exhaust unit, and information of an air cleaner not involved in the supply of the external gas to the internal space include an expense from an operation of the supply unit, the exhaust unit, and the air cleaner, the predicting includes predicting at least one of a first concentration that is the carbon dioxide concentration in a current operation state of the supply unit and the exhaust unit, a second concentration that is the carbon dioxide concentration in a case where at least one of the supply unit or the exhaust unit has changed from the current operation state, or the expense in a case where the carbon dioxide concentration is the second concentration; and providing the carbon dioxide concentration predicted in the predicting, wherein the providing includes providing at least one of the current carbon dioxide concentration, the first concentration, the second concentration, or the expense;

wherein the predicting includes controlling at least one of the supply unit or the exhaust unit such that based on the predicted second concentration, the carbon dioxide concentration of the internal space is set to be lower than or equal to a threshold concentration that is determined according to the risk of infection in a region and/or during each period;

the threshold concentration is changed, by online control, in accordance with a change of the risk of infection for each region and for each period, the predicting includes predicting the second concentration for each of operation states of at least one of the supply unit or the exhaust unit, and the providing includes providing the second concentration and the expense for each of the operation states, and provide information related to operation state in which the second concentration is lower than or equal to the threshold concentration.

* * * * *